US011773631B2

(12) United States Patent
Kuwayama et al.

(10) Patent No.: US 11,773,631 B2
(45) Date of Patent: Oct. 3, 2023

(54) COVER OPENING-CLOSING DEVICE

(71) Applicant: CHUO HATSUJO KABUSHIKI KAISHA, Nagoya (JP)

(72) Inventors: Toshio Kuwayama, Nagoya (JP); Hiroki Tanaka, Nagoya (JP); Takashi Tomoto, Nagoya (JP)

(73) Assignee: CHUO HATSUJO KABUSHIKI KAISHA, Nagoya (JP)

( * ) Notice: Subject to any disclaimer, the term of this patent is extended or adjusted under 35 U.S.C. 154(b) by 133 days.

(21) Appl. No.: 17/251,606

(22) PCT Filed: Aug. 21, 2019

(86) PCT No.: PCT/JP2019/032702
§ 371 (c)(1),
(2) Date: Dec. 11, 2020

(87) PCT Pub. No.: WO2020/040222
PCT Pub. Date: Feb. 27, 2020

(65) Prior Publication Data

US 2021/0246695 A1 Aug. 12, 2021

(30) Foreign Application Priority Data

Aug. 24, 2018 (JP) ................................ 2018-157303

(51) Int. Cl.
*E05B 83/34* (2014.01)
*E05B 81/28* (2014.01)
(Continued)

(52) U.S. Cl.
CPC .............. *E05B 83/34* (2013.01); *B60K 15/05* (2013.01); *E05B 81/28* (2013.01); *E05B 81/34* (2013.01);
(Continued)

(58) Field of Classification Search
CPC .......... E05B 83/34; E05B 81/28; E05B 81/34; E05C 19/02; E05C 19/022; B60K 2015/0584; B60K 15/05
See application file for complete search history.

(56) References Cited

U.S. PATENT DOCUMENTS 8,292,113 B2 * 10/2012 Nakaya .................. B60K 15/05 220/264
9,038,499 B2 * 5/2015 Ishiguro .................. E05C 19/02 220/315
(Continued)

FOREIGN PATENT DOCUMENTS

CN 102656044 A 9/2012
CN 202831888 A 3/2013
(Continued)

OTHER PUBLICATIONS

Espacenet machine translation of WO 2016/098851 A1, generated Jun. 29, 2022 (Year: 2022).*
(Continued)

*Primary Examiner* — Kristina R Fulton
*Assistant Examiner* — Emily G. Brown
(74) *Attorney, Agent, or Firm* — ArentFox Schiff LLP

(57) ABSTRACT

A cover opening-closing device comprises a rod, a casing in which at least a portion of the rod is stored, a lock unit, an interlock mechanism, and a connection unit. The lock unit can rotate about a central axis line between a lock position, in which locking with the cover is possible, and a release position, in which locking is not possible. The interlock mechanism is configured so that the rotation of the lock unit and the displacement of the rod are interlocked. The connection unit is configured so as to connect the lock unit to the casing and to restrict displacement of the lock unit in the direction of the central axis line.

12 Claims, 16 Drawing Sheets

(51) Int. Cl.
*E05C 19/02* (2006.01)
*B60K 15/05* (2006.01)
*E05B 81/34* (2014.01)

(52) U.S. Cl.
CPC ...... *E05C 19/02* (2013.01); *B60K 2015/0584* (2013.01)

(56) References Cited

U.S. PATENT DOCUMENTS

| | | | | |
|---|---|---|---|---|
| 10,683,685 | B2 * | 6/2020 | Sonobe | E05B 81/28 |
| 2009/0307869 | A1 * | 12/2009 | Salice | E05C 19/165 16/85 |
| 2010/0045049 | A1 * | 2/2010 | Persiani | B60K 15/05 292/14 |
| 2014/0251036 | A1 * | 9/2014 | Ishiguro | E05C 19/022 74/55 |
| 2017/0362863 | A1 * | 12/2017 | Sridhar | E05C 3/145 |
| 2019/0184819 | A1 * | 6/2019 | Kato | E05B 83/34 |
| 2021/0245598 | A1 * | 8/2021 | Serpeloni | B60K 15/05 |

FOREIGN PATENT DOCUMENTS

| | | | | |
|---|---|---|---|---|
| CN | 103872519 | A | 6/2014 | |
| CN | 104074414 | A | 10/2014 | |
| FR | 3001489 | A1 * | 8/2014 | E05B 83/34 |
| JP | 57407 | Y2 | 2/1993 | |
| JP | 201743893 | A | 3/2017 | |
| JP | 3219522 | U | 12/2018 | |
| WO | WO-2016098851 | A1 * | 6/2016 | B60K 15/05 |

OTHER PUBLICATIONS

Espacenet machine translation of FR 3001489 A1, generated Jun. 6, 2023 (Year: 2023).*

International Search Report and Written Opinion for International application No. PCT/JP2019/032702, dated Nov. 19, 2019, ISA/JP.

English translation of Written Opinion of the International Searching Authority for International Application No. PCT/JP2019/032702, dated Nov. 19, 2019, ISA/JP.

English translation of Decision to Grant a Patent for prior Japanese patent application No. 2018-157303, dated Feb. 3, 2022, Japanese Patent Office.

English translation of Search Report for corresponding Chinese Patent Application No. 2019800265126 dated Mar. 29, 2021, China National Intellectual Property Adminstration.

English translation of Supplemental Search Repod for corresponding Chinese Patent Application No. 2019800265126 dated Oct. 18, 2021, China National Intellectual Property Adminstration.

English translation of first Office Action for corresponding Chinese Patent Application No. 2019800265126 dated Apr. 8, 2021, China National Intellectual Property Adminstration.

Notification to Grant Patent Right for corresponding Chinese Patent Application No. 2019800265126 dated Oct. 26, 2021, China National Intellectual Property Adminstration.

* cited by examiner

COVER OPENING-CLOSING DEVICE

CROSS-REFERENCE TO RELATED APPLICATIONS

This application is a 371 U.S. national stage of PCT/JP2019/032702, filed Aug. 21, 2019, which claims priority of Japanese Patent Application No. 2018-157303, filed Aug. 24, 2018, contents of each of which are incorporated by reference.

TECHNICAL FIELD OF THE INVENTION

The present disclosure relates to a device for opening and closing a cover body, which controls opening and closing of an opening portion achieved by a cover body.

BACKGROUND OF THE INVENTION

For example, a device for opening and closing a cover body described in Patent Document 1 has a cylinder-shaped rotation axis, a linear motion axis inserted into the rotation axis and others. The rotation axis can rotate relative to the linear motion axis. The linear motion axis can move integrally with the rotation axis back and forth in the length direction.

The front end of the rotation axis is provided with a locking portion that can be locked with the cover body. The rotation axis moves integrally with the linear motion axis back and forth while rotating relative to the linear motion axis. Thereby, the locking portion is displaced rotationally between latch-up position and non-latch-up position. The latch-up position is a position locking with the cover body, and the non-latch-up position is a position where the locking is released.

PRIOR ART DOCUMENT

Patent Document

Patent Document 1: Japanese Patent Application Publication No. 2017-43893

SUMMARY OF THE INVENTION

The problem to be solved by the present disclosure

In the technique described in Patent Document 1, when the locking portion is locked with the cover body, if an external force in the direction of opening the cover body acts on the cover body, the external force acts on the linear motion axis via the locking portion and the rotation axis.

The above-mentioned external force acts in the same direction as the displacement direction of the linear motion axis. Therefore, when the locking portion is located at the latch-up position, a mechanism is required to limit the displacement of the linear motion axis due to the external force.

Therefore, in the device for opening and closing a cover body described in Patent Document 1, it is difficult to reduce the number of parts and simplify the structure. In one aspect of the present disclosure, it is desirable to reduce the number of parts and simplify the structure.

The means to address the problem

The device for opening and closing a cover body of one aspect of the present disclosure controls the opening and closing of the opening portion achieved by the cover body. The device for opening and closing a cover body comprises: a rod that can be displaced between the first position and the second position; a casing in which at least a portion of the rod is contained; a locking portion that can be displaced between a lock position and a release position, wherein the locking portion can rotate about a central axis parallel to the displacement direction of the rod, wherein the lock position is a position that can be locked with the cover body, and the release position is a position that cannot be locked with the cover body; a linkage mechanism configured to achieve a linkage between the rotational displacement of the locking portion and the displacement of the rod; and a connecting portion configured to connect the locking portion to the casing, so as to allow the locking portion to rotate between the lock position and the release position and to restrict displacement of the locking portion in the direction of the central axis.

This thus promotes most of "external force in the opening direction (hereinafter, referred to as "external force")" that acts on the cover body, to act on the casing via the locking portion. That is to say, it is possible to suppress the external force from acting on the rod that can be displaced. Therefore, the number of parts of the device for opening and closing a cover body can be reduced and the structure can be simplified.

REFERENCE SIGNS

1: Device for opening and closing a cover body,
3: Cover body,
5: Rod device,

7: Locking device,
51: Push rod,
52: Rod casing,
53: Locking portion,
53A: Connecting portion,
53B: Locking component,
53C: Through hole,
53D: Fitting portion,
53E: Fitted portion,
54: Linkage mechanism,
54A: Cam groove,
54B: Protrusion portion,
54C: Detachment groove,
55: Alternation mechanism.

DETAILED DESCRIPTION OF THE INVENTION

The following description shows an example of an embodiment within the technical scope of the present disclosure. That is to say, the present disclosure is not limited to the specific structures, constructions, or others shown in the following embodiments.

In addition, arrows indicating directions marked in each figure are described for easy understanding of the relationship among the figures. The present disclosure is not limited to the directions marked in each figure.

For the components or sites described at least with reference signs, at least one is provided except for the case where "one" is expressed. That is to say, in the cases where "one" is not expressed, two or more of these components may be provided.

The First Embodiment

1. Overview of the Device for Opening and Closing a Cover Body

Figure 1:
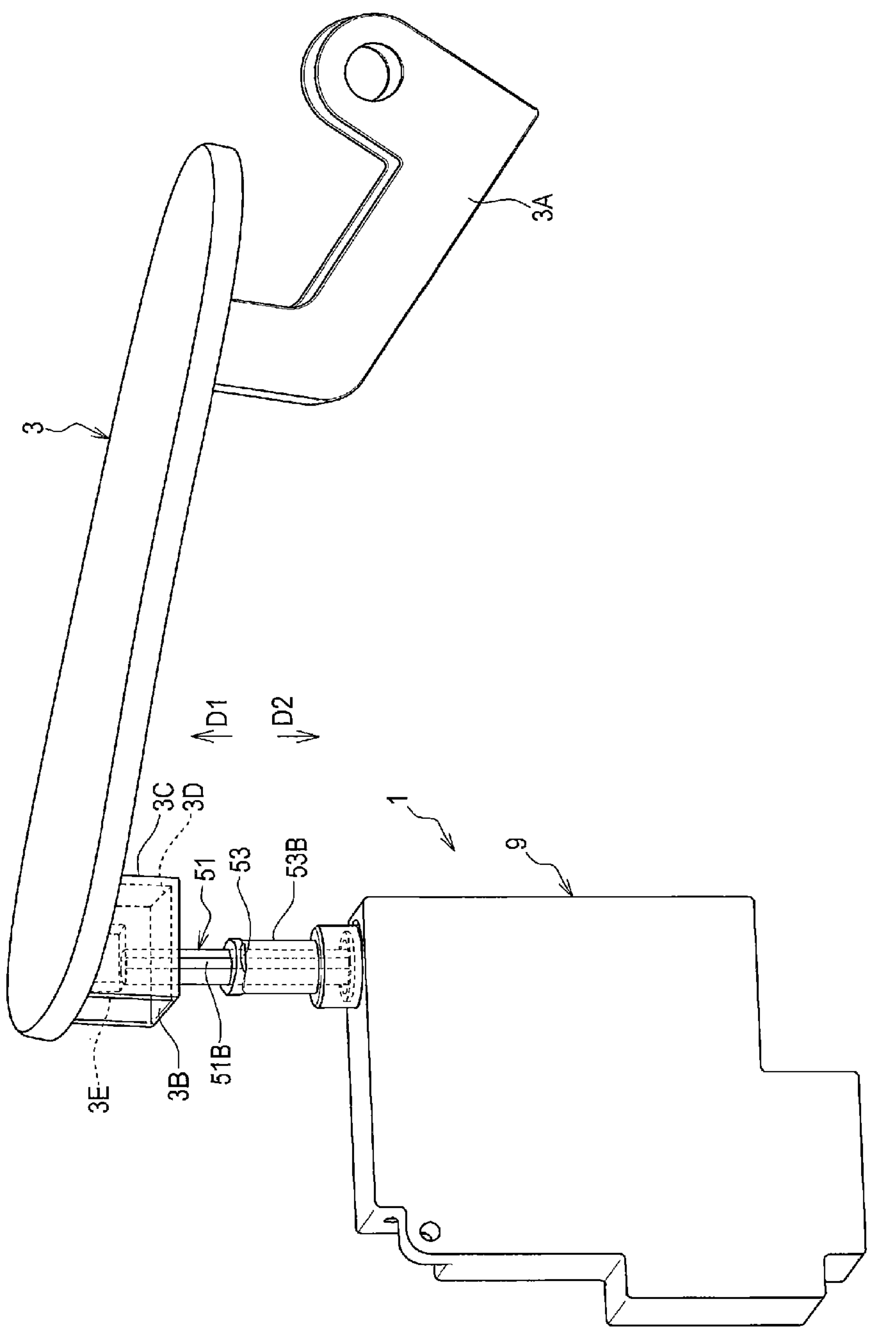
FIG. 1 is a diagram showing the device for opening and closing a cover body of the first embodiment.

In the first embodiment, an example of the device for opening and closing a cover body of the present disclosure is applicable to a vehicle. Specifically, as shown in FIG. 1, the device for opening and closing a cover body 1, as an example, controls the opening and closing actions of the cover body 3.

The cover body 3 is an example of a closing body that opens and closes a fuel filler (not shown in drawings) of a vehicle. The fuel filler is an example of the opening portion. The fuel filler is disposed on the outer panel (not shown in drawings) of the vehicle. The cover body 3 is mounted on the outer plate through the hinge portion 3A. The cover body 3 can be rotated relative to the outer plate centering on an imaginary line perpendicular to the paper surface of FIG. 1.

Figure 2:
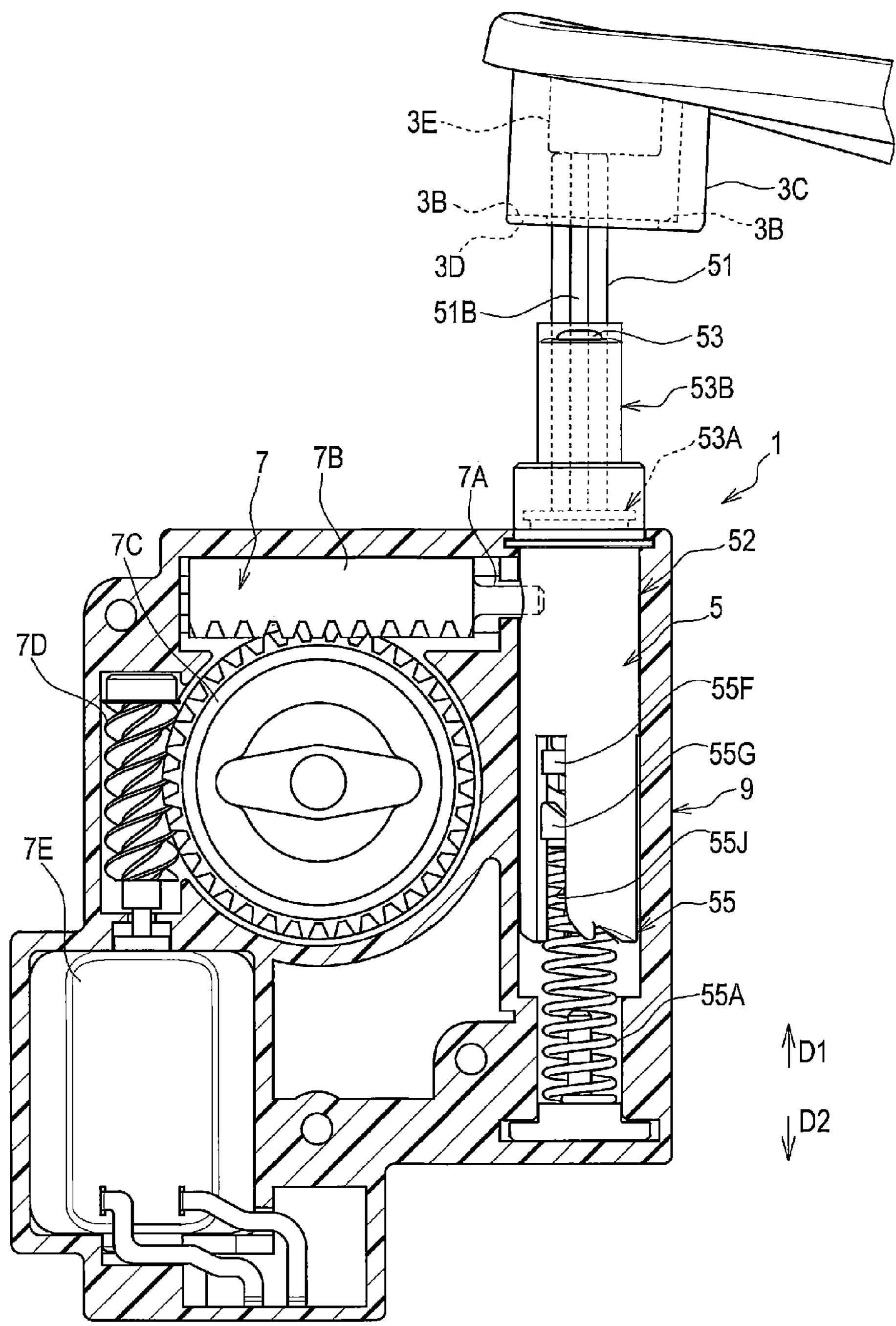
FIG. 2 is a diagram showing the device for opening and closing a cover body of the first embodiment.

2. Structure of the Device for Opening and Closing a Cover Body 2.1 Overview of the Device for Opening and Closing a Cover Body As shown in FIG. 2, the device for opening and closing a cover body 1 at least has a rod device 5 and a locking device 7. The rod device 5 controls the opening and closing actions of the cover body 3. The locking device 7 restricts the movement of the rod device 5.

2.2 the Structure of the Rod Device

Figure 3:
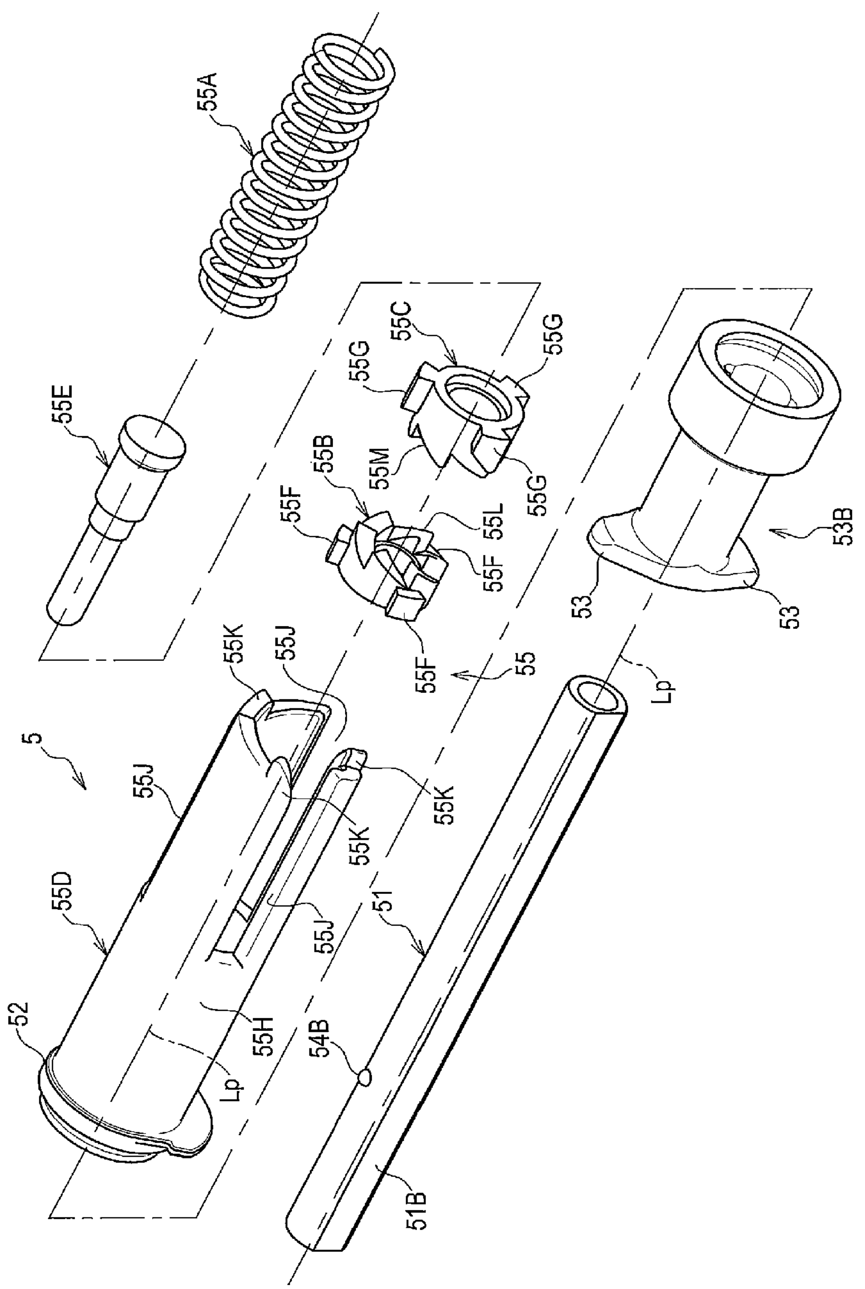
FIG. 3 is an exploded view showing the alternation mechanism of the first embodiment.

As shown in FIG. 3, the rod device 5 at least has a push rod 51, a rod casing 52, a locking portion 53, a linkage mechanism 54 (refer to FIG. 12), an alternation mechanism 55, and the like.

<Push Rod>

Figure 4:
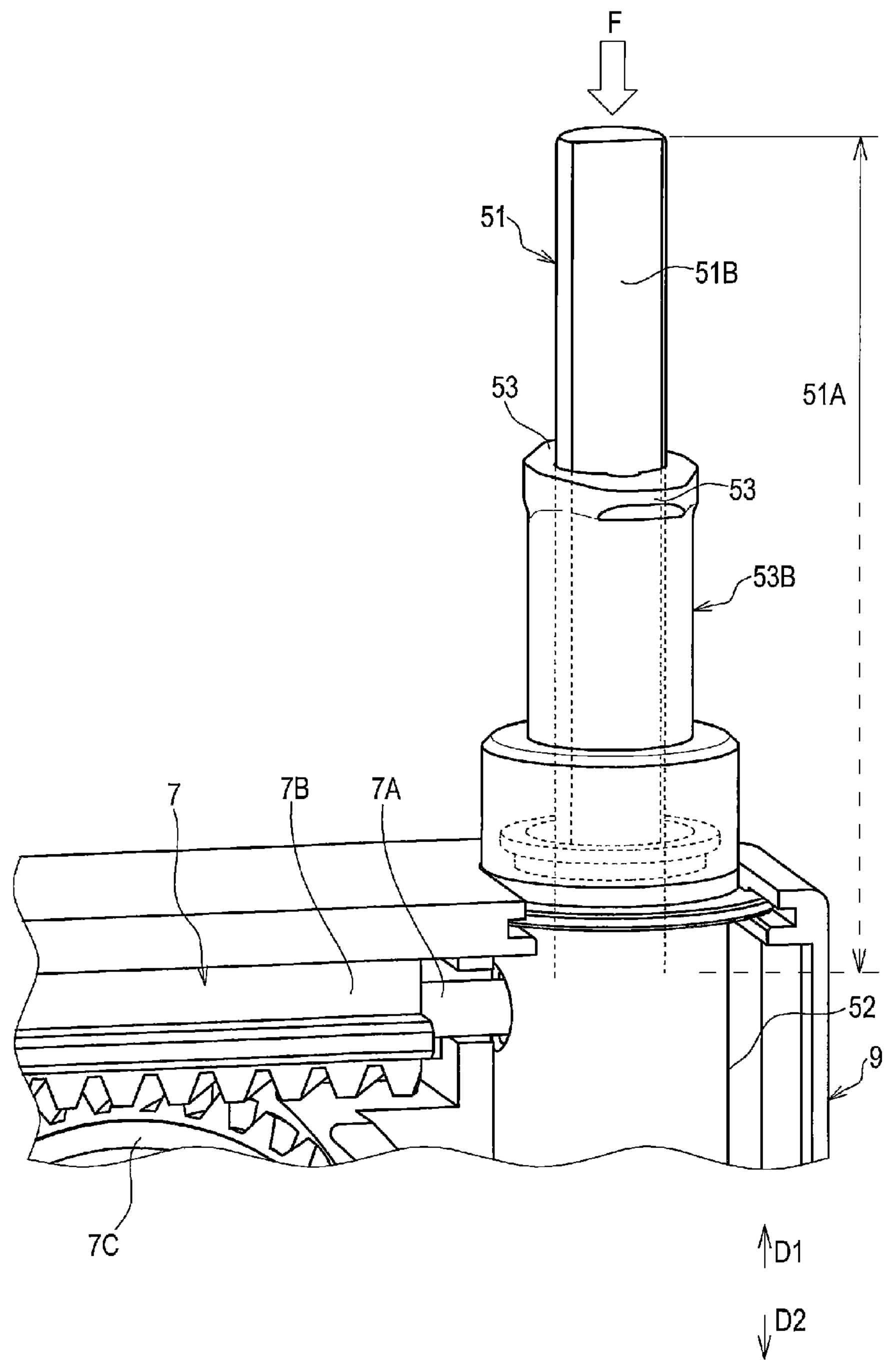
FIG. 4 is a diagram showing a release position and a protruding position in the first embodiment.
Figure 5:
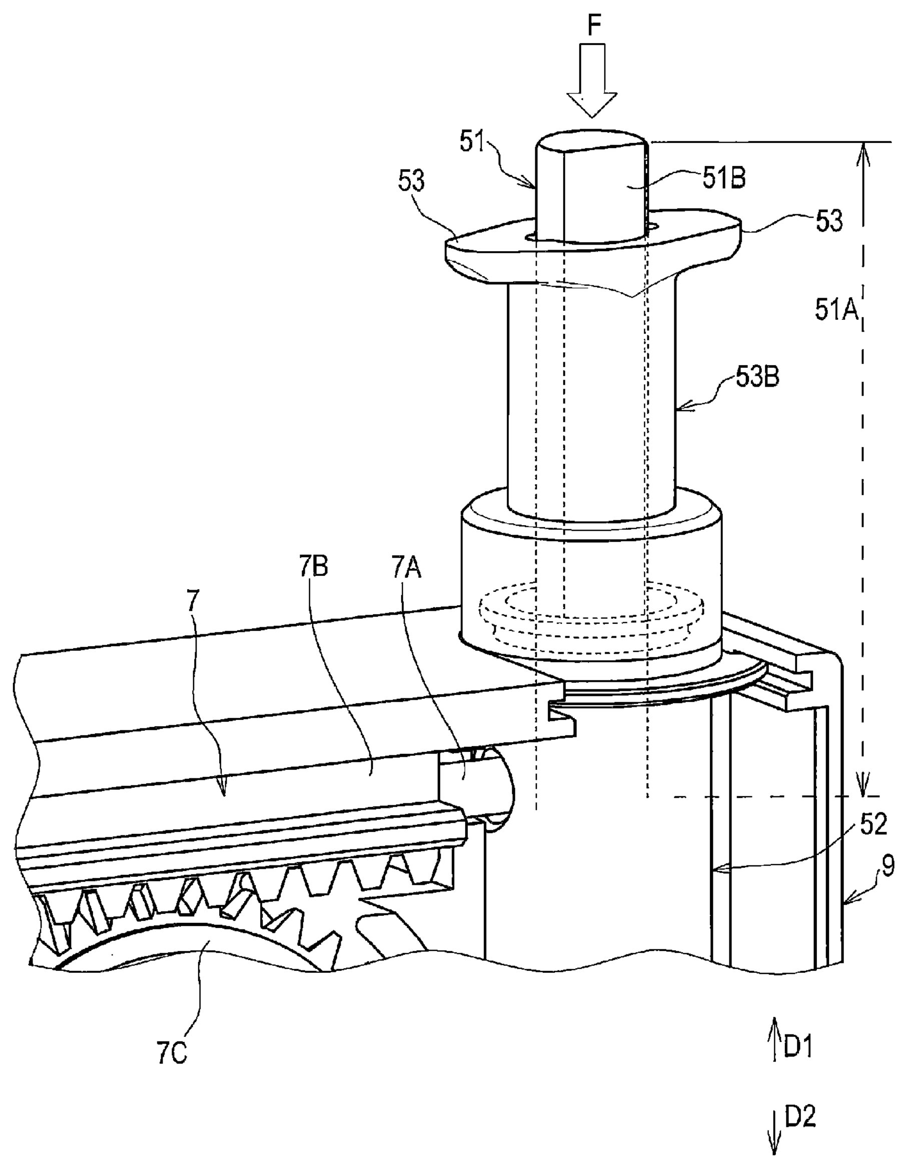
FIG. 5 is a diagram showing a lock position and a containing position in the first embodiment.

The push rod 51 is a rod-shaped component that is displaced between the protruding position (refer to FIG. 4) and the containing position (refer to FIG. 5). Each time when receiving a pressing force F (refer to FIGS. 4 and 5), the push rod 51 is alternately displaced between the protruding position and the containing position (hereinafter, also referred to as alternate displacement).

That is to say, if the push rod 51 receives the pressing force F when it is in the protruding position, it will be displaced to the containing position due to the action of the pressing force F. If the push rod 51 receives the pressing force F when it is in the containing position, it will be displaced to the protruding position due to the action of the elastic force of the spring 55A (refer to FIG. 3).

As shown in FIG. 4, in the protruding position, the part 51A of the push rod 51 protrudes from the rod casing 52. As shown in FIG. 5, in the containing position, at least a part of the part 51A is contained in the rod casing 52.

In addition, the protruding position is an example of the first position. The containing position is an example of the second position. The pressing force F is, for example, a force acting in the length direction of the push rod 51.

The rod casing 52 is a cylindrical component having an insertion hole (not shown in drawings), and the push rod 51 can be inserted into the insertion hole by going in and out. The sectional shape of the insertion hole can enable the push rod 51 only to rotate around the central axis Lp (refer to FIG. 3).

The sectional shape is, for example, substantially D-shaped. The substantially D-shaped shape has an arc portion and a straight-line portion, and the straight-line portion connects both ends of the arc portion. Moreover, a flat portion 51B (refer to FIG. 4) is disposed at a site corresponding to the straight-line portion on the push rod 51.

Therefore, each time the pressing force F is received, the push rod 51, parallel to the central axis Lp, is displaced back and forth between the protruding position and the containing position, without rotating around the central axis Lp. In other words, the flat portion 51B constitutes a restriction portion that restricts the rotation of the push rod 51. In addition, the central axis Lp coincides with the central axis of the push rod 51.

<Alternation Mechanism>

The alternation mechanism 55 enable the push rod 51 to be alternately displaced. As shown in FIG. 3, this alternation mechanism 55 at least has a spring 55A, a first cam 55B, a second cam 55C, a restriction cylinder 55D and an axis component 55E, among others.

Figure 8:
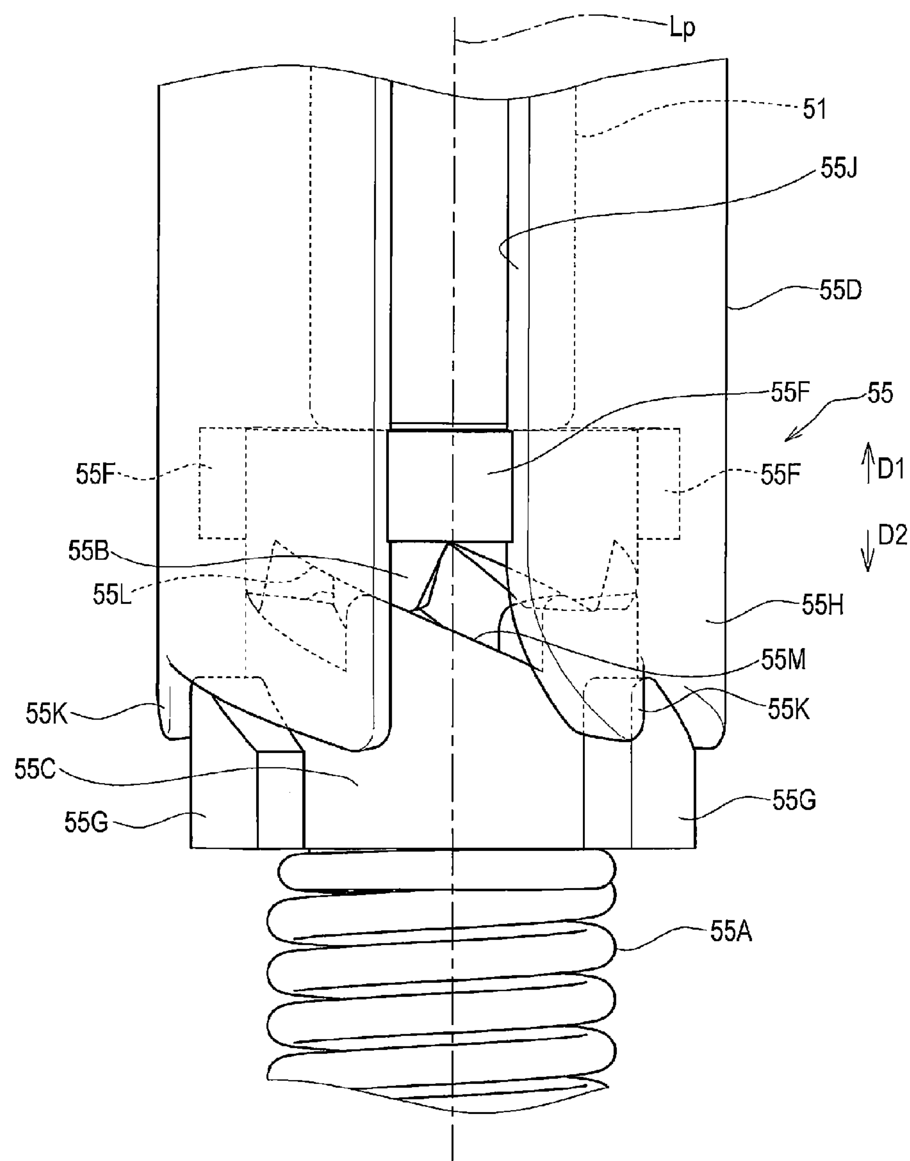
FIG. 8 is an operation explanatory diagram of the alternation mechanism of the first embodiment.

The spring 55A can generate an elastic force towards the upper direction of the paper surface in FIG. 8. The "upper direction of the paper surface in FIG. 8" refers to the direction from the containing position to the protruding position. Hereinafter, this direction is referred to as "protruding direction D1". The direction opposite to the protruding direction D1 is referred to as "containing direction D2".

Figure 6:
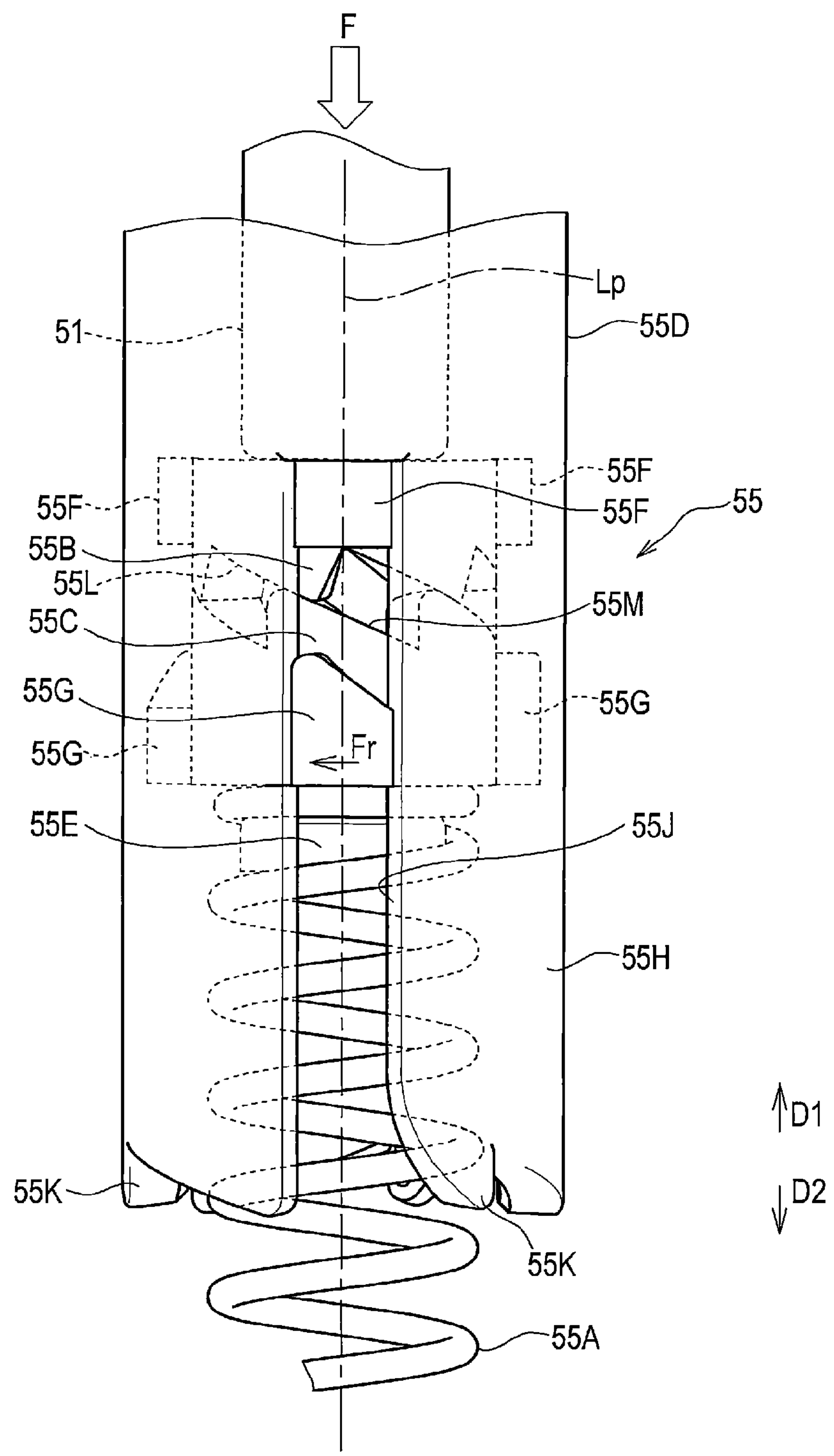
FIG. 6 is an operation explanatory diagram of the alternation mechanism of the first embodiment.

As shown in FIG. 6, the axis component 55E can be rotationally inserted in the first cam 55B and the second cam 55C. The axis component 55E rotates around the central axis Lp, and is integrated into the push rod 51 by fixing techniques such as press-fitting.

In other words, the first cam 55B and the second cam 55C can be integrated with the push rod 51 by means of rotating about the central axis Lp. At least one (as an example, three) protrusion portion 55F is disposed on the outer peripheral surface of the first cam 55B.

At least one protrusion portion 55G is also disposed on the outer peripheral surface of the second cam 55C. In the first embodiment, as an example, the number of protrusion portions 55G is the same as the number of protrusion portions 55F. Each protrusion portion 55F and each protrusion portion 55G respectively protrude from the outer peripheral surface in a direction perpendicular to the central axis Lp.

As shown in FIG. 3, slot portions 55J of the same number as the number of the protrusion portions 55G are disposed on the outer peripheral wall 55H of the restriction cylinder 55D. These slot portions 55J extend in parallel with the central axis Lp to one end (hereinafter, referred to as the first end) of the restriction cylinder 55D. Each slot portion 55J is open at the first end.

Figure 7:
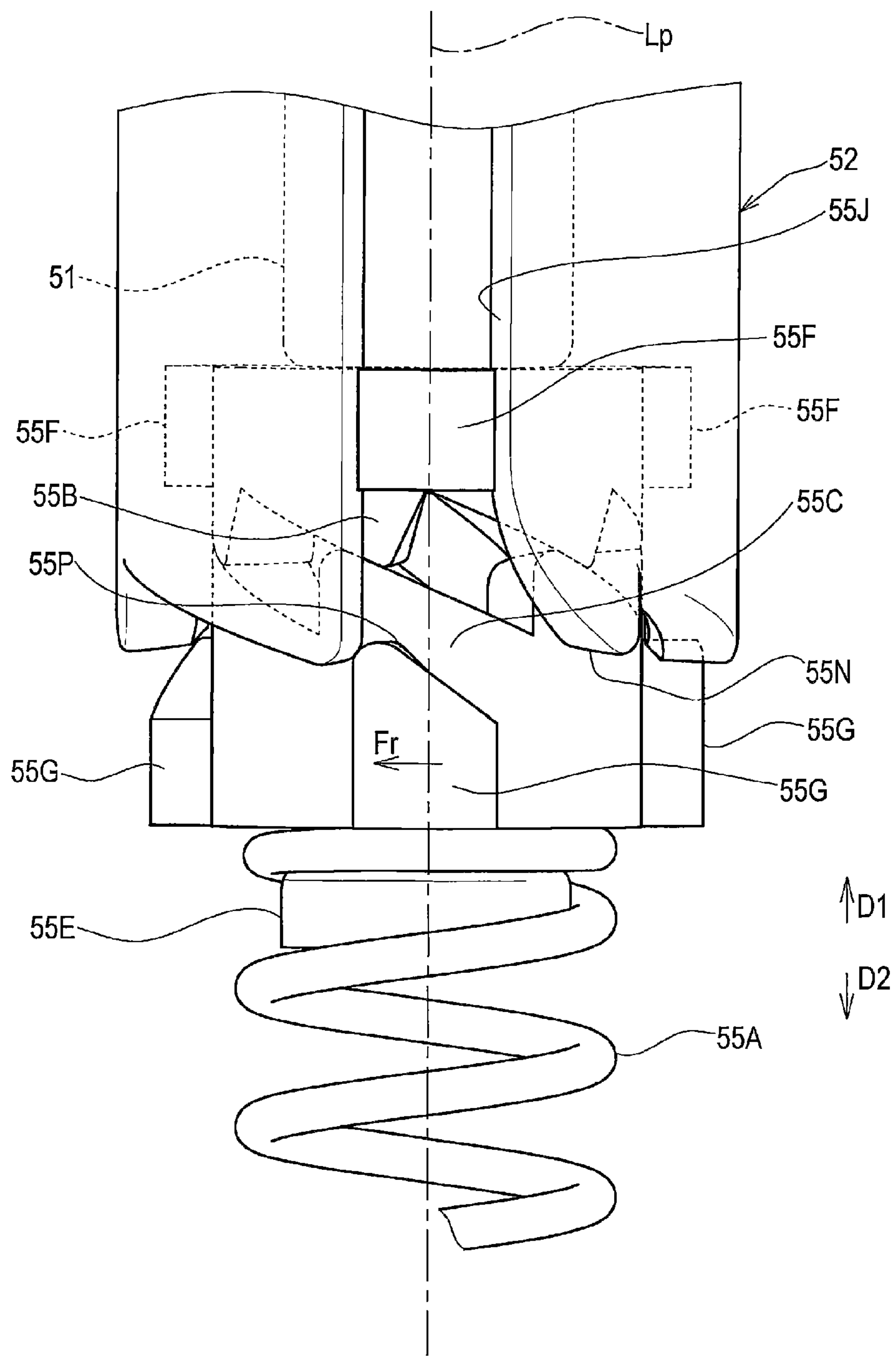
FIG. 7 is an operation explanatory diagram of the alternation mechanism of the first embodiment.

Each protrusion portion 55F is fitted into each slot portion 55J, and each protrusion portion 55F can be displaced within the slot portion 55J in the extending direction of the slot portion 55J (refer to FIGS. 6 to 8). That is to say, the first cam 55B is displaced in the direction of the central axis Lp rather than rotating about the central axis Lp.

Each protrusion portion 55G can be displaced between a fitting position and a detachment position. The fitting position is the position where each protrusion portion 55G is fitted into any one of slot portions 55J (refer to FIG. 6), and the detachment position is the position where each protrusion portion 55G is detached from the slot portion 55J (refer to FIG. 8). That is to say, when each protrusion portion 55G is located in a position to fit into any one of the slot portions 55J, the second cam 55C is displaced in the direction of the central axis Lp rather than rotating around the central axis Lp.

When each protrusion portion 55G is detached from the slot portion 55J, the second cam 55C can rotate about the central axis Lp. At the first end of the restriction cylinder 55D, the open end of each slot portion 55J is disposed, and at least one locking protrusion portion 55K that can be locked with each protrusion portion 55G is provided Each locking protrusion portion 55K protrudes in the containing direction D2 from the first end of the restriction cylinder 55D. Moreover, in a state in which any one of the protrusion portions 55G is locked with any one of the locking protrusion portions 55K to be locked (hereinafter referred to as a locking state), the rotation of the second cam 55C is restricted.

The position of the bottom of each locking protrusion portion 55K deviates towards the protruding direction D1 from the open end of each slot portion 55J. A spring 55A always presses the second cam 55C in the protruding direction D1. Therefore, in the state shown in FIG. 8, the elastic force of the spring 55A can maintain the locking state between the protrusion portion 55G and the locking protrusion portion 55K.

As shown in FIG. 6, the first cam 55B and the second cam 55C can perform a function of converting the pressing force F in the containing direction D2 into a rotating force Fr. The rotating force Fr enables the second cam 55C to be rotated in the direction of the arrow in FIG. 6.

In other words, at least one inclined surface 55L is disposed (in the first embodiment, as an example, several are disposed) in the first cam 55B. At least one inclined surface 55M is disposed (in the first embodiment, as an example, several are disposed) in the second cam 55C.

The inclined surfaces 55L and 55M are inclined with respect to the direction of the pressing force F. The inclination direction of each inclined surface 55L, 55M is adjusted so that when the inclined surface 55L is in contact with the inclined surface 55M, the component force of the pressing force F generated on the inclined surface 55M becomes the rotating force Fr.

<Locking Portion>

Figure 9:
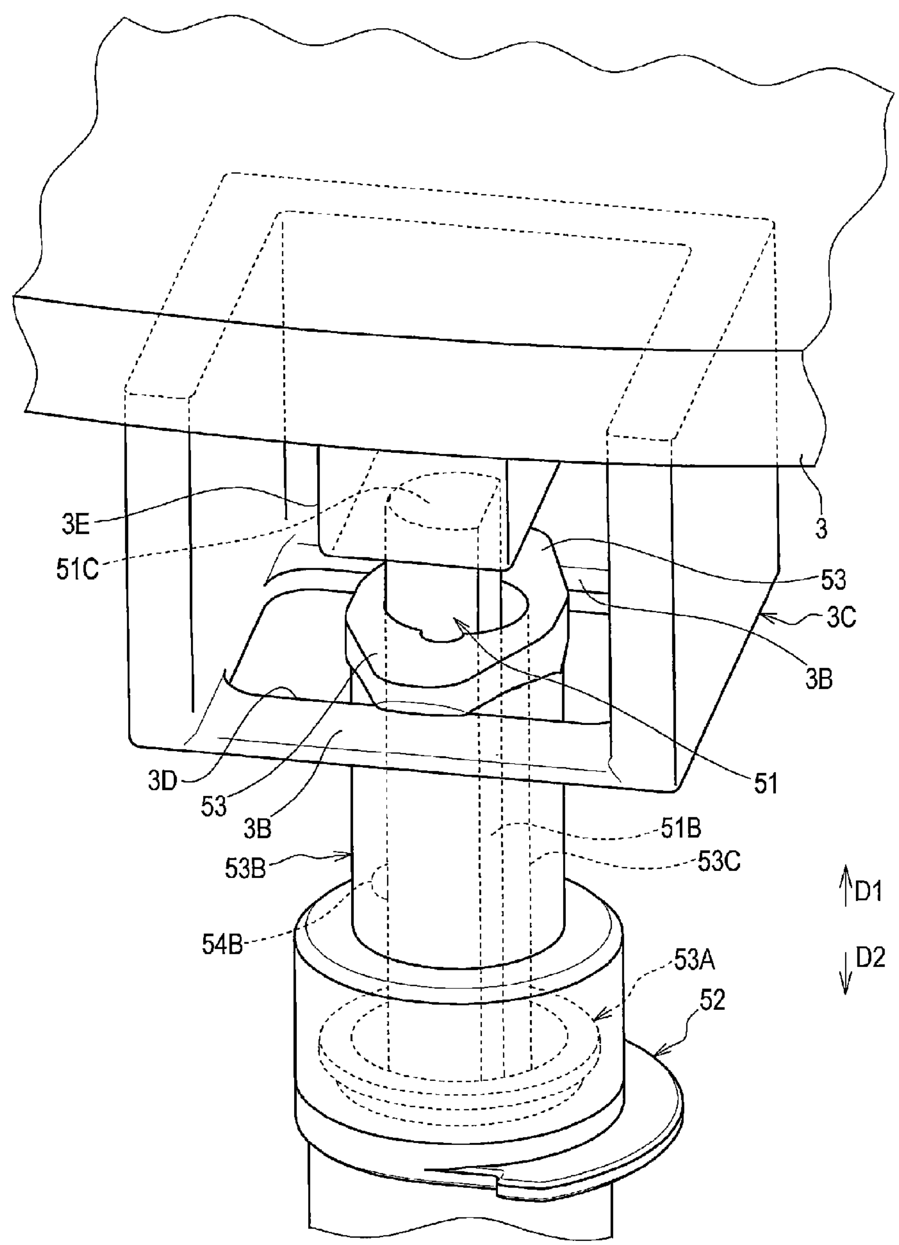
FIG. 9 is an operation explanatory diagram of the device for opening and closing a cover body of the first embodiment.
Figure 10:
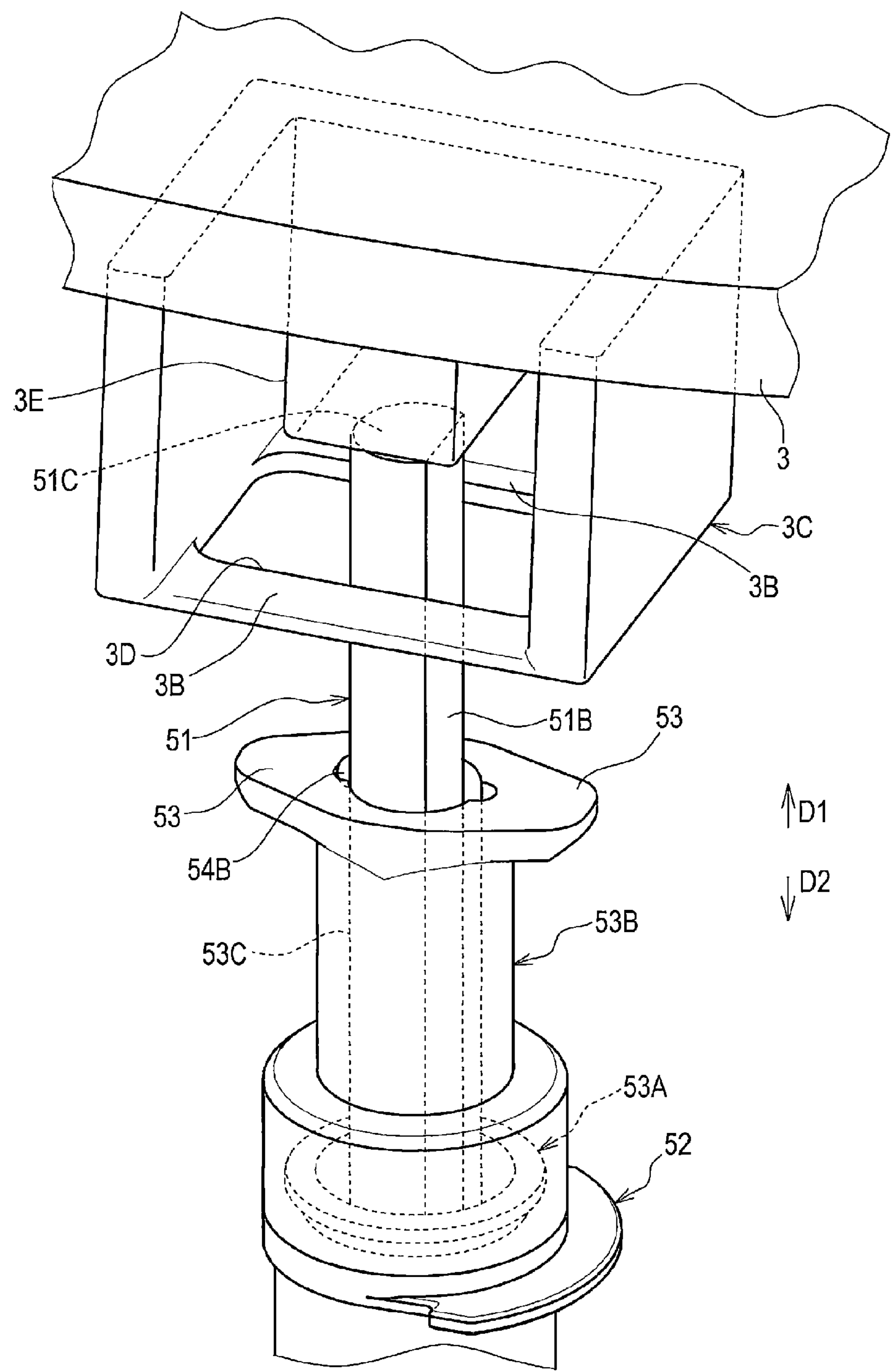
FIG. 10 is an operation explanatory diagram of the device for opening and closing a cover body of the first embodiment.

The locking portion 53 can be rotationally displaced between the lock position (refer to FIG. 9) and the release position (refer to FIG. 10). As shown in FIG. 9, in the lock position, the locking portion 53 can be locked with a locked portion 3B. As shown in FIG. 10, in the release position, the locking portion 53 cannot be locked with the locked portion 3B.

In other words, the locking portion 53 can rotate around a central axis parallel to the displacement direction of the push rod 51. The displacement direction of the push rod 51 is parallel to the center axis Lp of the push rod 51.

In addition, in the first embodiment, the rotation central axis of the locking portion 53 coincides with the central axis Lp of the push rod 51. Therefore, in the following description, the rotation central axis of the locking portion 53 is also referred to as the central axis Lp.

The device for opening and closing a cover body 1 of the first embodiment has two locking portions 53 (first and second locking portion 53). The locking portions 53 are disposed at symmetrical positions across the central axis Lp. In other words, relative to the second locking portion 53, the first locking portion 53 is offset by approximately 180 degrees in the circumferential direction centering on the central axis Lp.

The locked portion 3B is disposed on the cover body 3. This locked portion 3B has a surface intersecting the central axis Lp. In the first embodiment, as an example, the locked portion 3B is integrated with the cover body 3 by a box-shaped locked body 3C.

The part of the locked body 3C facing the push rod 51 is at least provided with a through hole 3D through which the push rod 51 can penetrate. The locked portion 3B is disposed at the outer edge of the through hole 3D. In addition, in the first embodiment, the locked portions 3B are respectively disposed at two positions across the through hole 3D.

In other words, in the cover body 3 of the first embodiment, two locked portions 3B (the first and second locked portions 3B) are disposed. Relative to the second locked portion 3B, the first locked portion 3B is offset by approximately 180 degrees in the circumferential direction centering on the central axis Lp.

Figure 11:
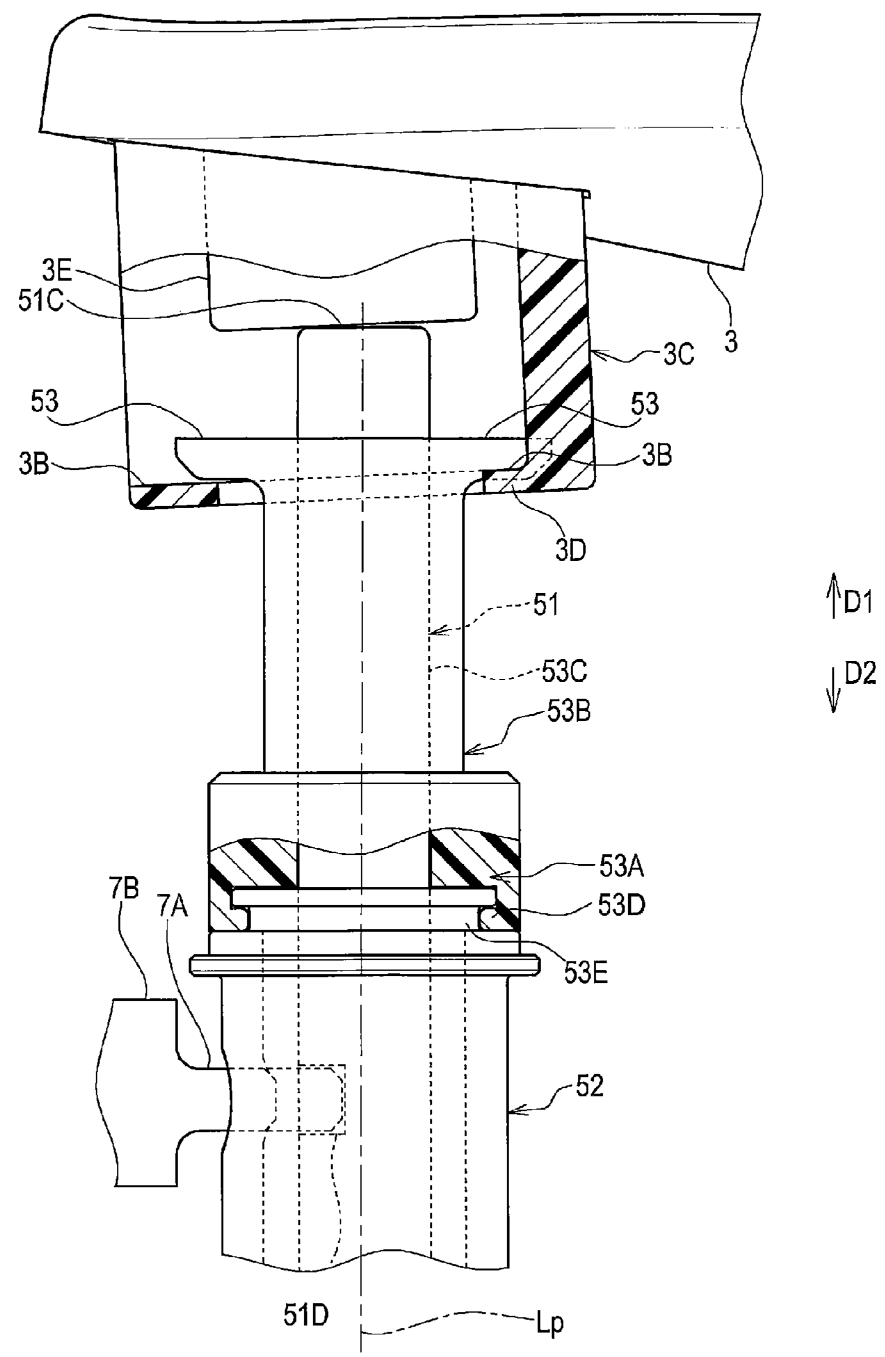
FIG. 11 is a diagram showing the structure of the connecting portion of the first embodiment.

As shown in FIG. 11, the two locking portions 53 are connected to the rod casing 52 through the connecting portion 53A. The connecting portion 53A allows the two locking portions 53 to rotate between the lock position and the release position, and restricts the displacement of the locking portions 53 in the direction of the central axis Lp.

In other words, the two locking portions 53 are disposed at the second end of the cylindrical locking component 53B in the axial direction. The locking component 53B is provided with a through hole 53C penetrated by the push rod 51. Furthermore, as an example, the two locking portions 53 and the locking component 53B are integrated, and they are resin products or metal products.

A fitting portion 53D is disposed at the first end of the locking component 53B in the axial direction, and the fitting portion 53D is included in the connecting portion 53A. The fitting portion 53D is locked with the fitted portion 53E disposed on the rod casing 52 by means of fitting (or imbedding).

Thereby, the two locking portions 53, namely the locking component 53B, and the rod casing 52 are connected in a way of being able to rotate. In other words, the two locking portions 53, namely the locking component 53B, are supported by the rod casing 52.

<Linkage Mechanism>

Figure 12:
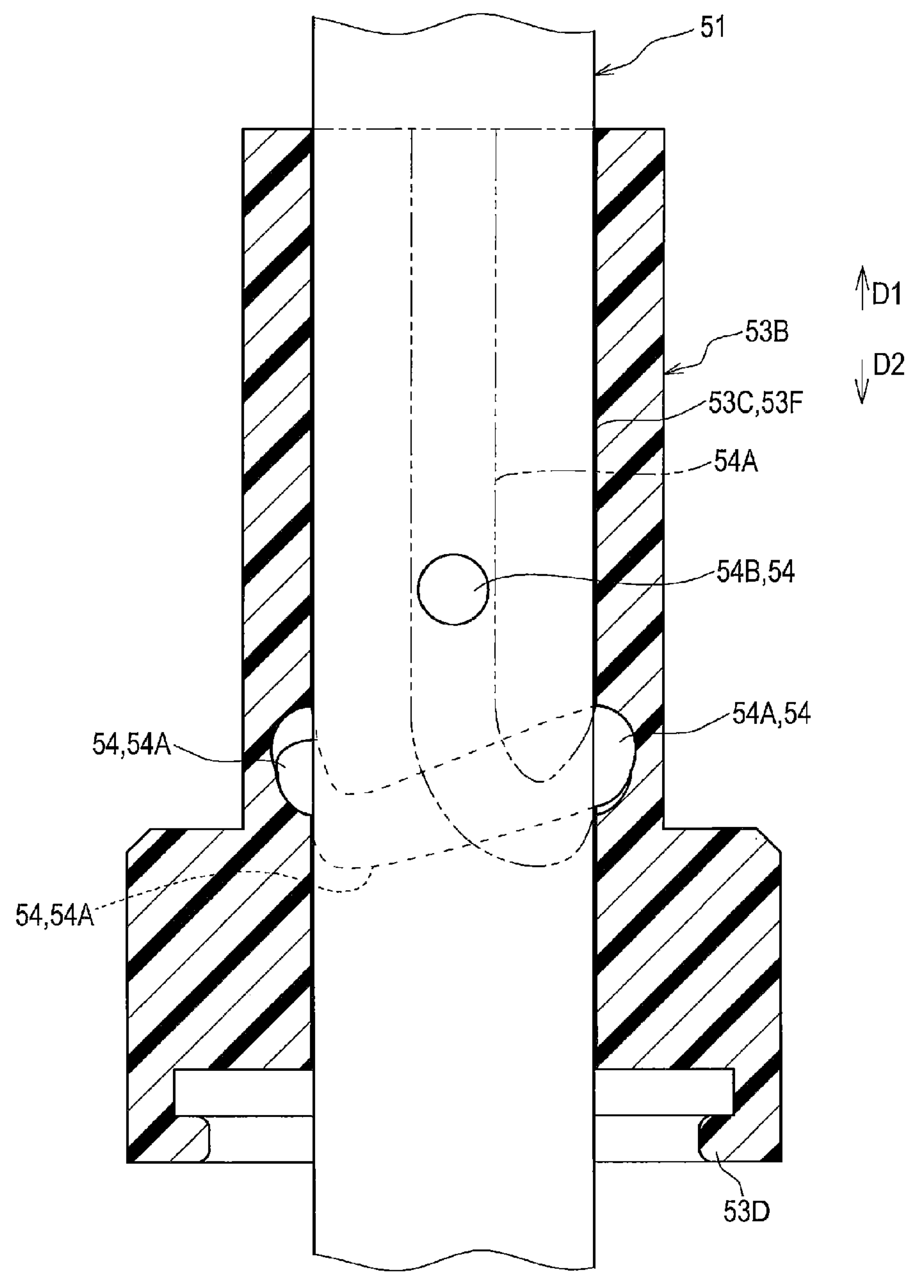
FIG. 12 is a diagram showing a cam groove and a protrusion portion of the first embodiment.

The linkage mechanism 54 enables a linkage between the rotational displacement of the two locking portions 53 and the reciprocation displacement of the push rod 51. As shown in FIG. 12, the linkage mechanism 54 of the first embodiment has a cam groove 54A, a protrusion portion 54B, and the like.

The cam groove 54A is a guide groove, and the cam groove 54A is disposed on either surface of the outer peripheral surface of the push rod 51 and the inner peripheral surface of the through hole 53C (in the first embodiment, on the inner peripheral surface 53F of the through hole 53C). The protrusion portion 54B is disposed on the other surface (in the first embodiment, on the outer peripheral surface of the push rod 51).

The protrusion portion 54B protrudes from the outer peripheral surface of the push rod 51 to the inner peripheral surface 53F, and is in sliding contact with the inner wall of the cam groove 54A. The protrusion portion 54B of the first embodiment is a hemispherical protrusion.

Figure 13:
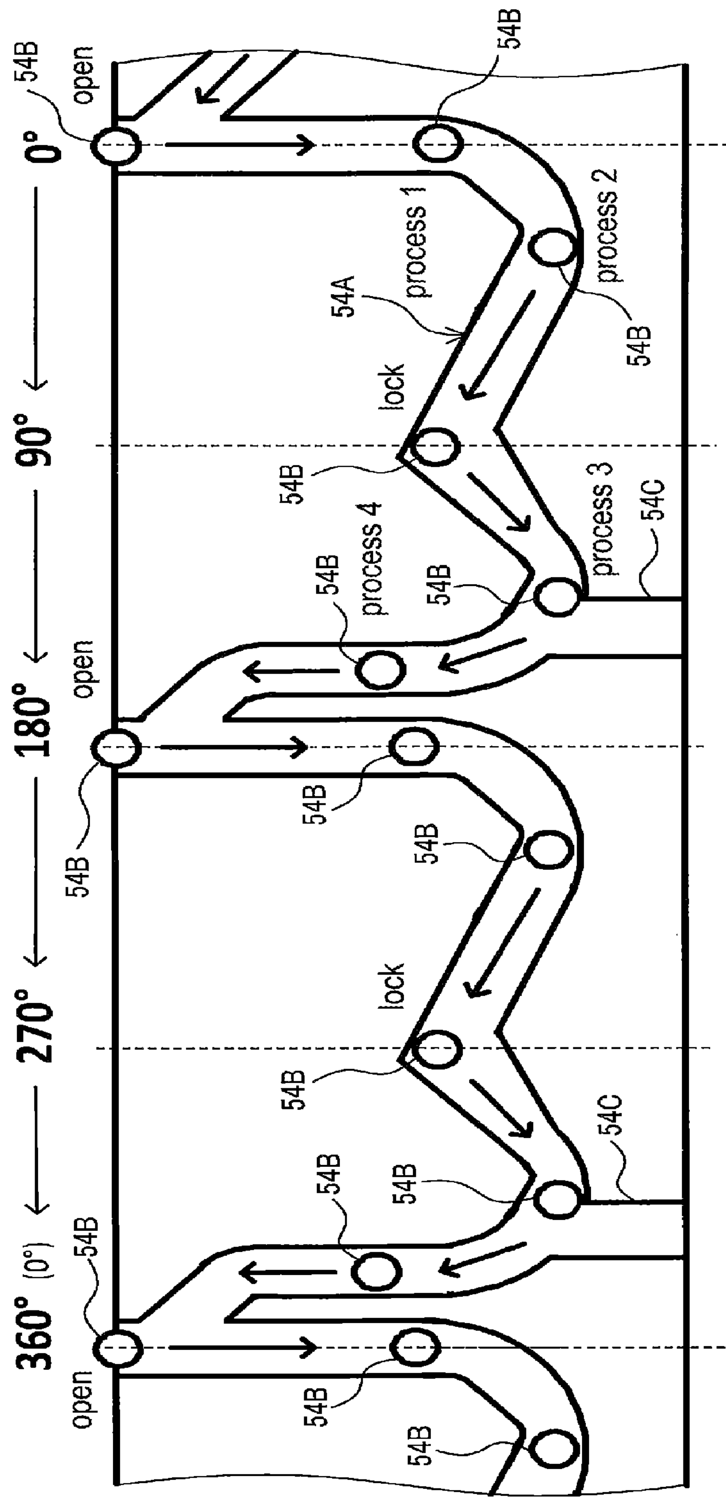
FIG. 13 is a diagram showing a cam groove and a protrusion portion of the first embodiment.

As shown in FIG. 13, the cam groove 54A constitutes a closed annular guide groove. In other words, if the protrusion portion 54B is displaced in one direction within the cam groove 54A, the protrusion portion 54B is displaced by means of surrounding the inner peripheral surface 53F.

The vertical direction of the paper surface in FIG. 13 is a direction parallel to the central axis Lp (hereinafter referred to as the axial direction). When the protrusion portion 54B moves in a part of the cam groove 54A that is parallel to the vertical direction of the paper surface (hereinafter referred to as the axial groove), the push rod 51 moves in the axial direction, and the locking component 53B does not rotate relative to the push rod 51.

When the protrusion portion 54B moves in a part of the cam groove 54A that is inclined with respect to the vertical direction of the paper surface (hereinafter referred to as a radial groove), the push rod 51 moves in the axial direction, and the locking component 53B rotates relative to the push rod 51.

Therefore, when the protrusion portion 54B is in the radial groove, if the push rod 51 performs reciprocation displacement, the locking component 53B, namely the two locking portions 53, performs rotational displacement interlocked with the reciprocation displacement of the push rod 51. In other words, the linkage mechanism 54 enables the two locking portions 53 to be rotationally displaced by using the force that enables the push rod 51 to be displaced in the axial direction.

Figure 14:
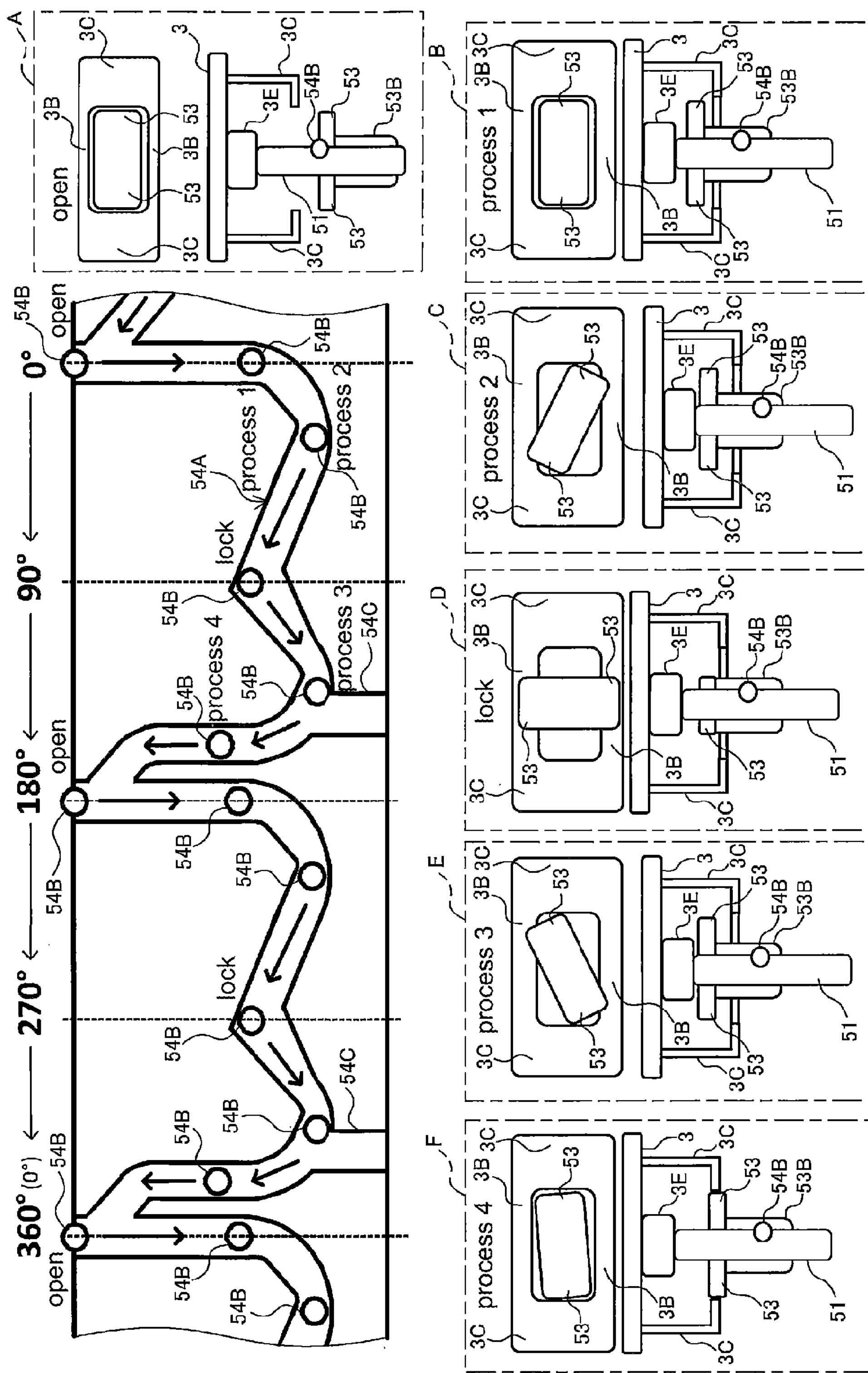
FIG. 14 is an operation explanatory diagram of the linkage mechanism of the first embodiment.

As shown in FIG. 14, the cam groove 54A, namely the linkage mechanism 54, is configured to enable the locking portion 53 to be rotationally displaced when the locking portion 53 is away from the locked portion 3B. In addition, "when the locking portion 53 is away from the locked portion 3B" refers to the time when the contact surface pressure of the locking portion 53 and the locked portion 3B is lower than the preset upper limit.

Therefore, even if the locking portion 53 is in contact with the locked portion 3B, when the contact surface pressure of the locking portion 53 and the locked portion 3B is lower than the upper limit, it is equivalent to "when the locking portion 53 is away from the locked portion 3B".

Furthermore, as shown in FIG. 10, at least when the locking portion 53 is in the release position, the second end 51C of the push rod 51 is located closer to the cover body 3 than the locking portion 53. In addition, the second end 51C refers to an end of the push rod 51 on the side of locking portion 53 in the length direction.

That is to say, when the locking portion 53 is in the release position, the push rod 51 penetrates through the through hole 53C of the locking component 53B, and the second end 51C of the push rod 51 contacts or is close to a part 3E of the cover body 3.

As shown in FIG. 13, the inner peripheral surface 53F is provided with a detachment groove 54C that branches from the cam groove 54A and extends to the first end (the lower end of the paper surface of FIG. 13) of the inner peripheral surface 53F. The first end is the side opposite to the second end of the locking component 53B where the locking portion 53 is disposed.

In the cam groove 54A, the branch portion leading to the detachment groove 54C is disposed at a position deviating from the "lock position of the protrusion portion 54B" to the side of "release position of the protrusion portion 54B" (in other words, the side where the protrusion portion 54 performs rotational displacement in response to the application of the pressing force F).

The "lock position of the protrusion portion 54B" refers to the position of the protrusion portion 54B in the cam groove 54A when the two locking portions 53 are in the lock position. The "release position of the protrusion portion 54B" refers to the position of the protrusion portion 54B in the cam groove 54A when the two locking portions 53 are in the release position.

In addition, in the cam groove 54A, the position of the branch portion of the first embodiment is a position deviating towards the release position compared to that equivalent to the position of the bottom dead center described hereunder. In other words, the branch portion deviates to the release position compared to the "position in the cam groove 54A of the protrusion portion 54B that is most displaced in the containing direction D2, when the protrusion portion 54B is displaced from the lock position to the release position".

<Locking Device>

The locking device 7 functions to keep the push rod 51 in the containing position. Specifically, as shown in FIG. 5, the locking device 7 at least has a lock rod 7A and the like.

The lock rod 7A penetrates the rod casing 52 and is fitted into the push rod 51. The push rod 51 is provided therein with a recess 51D into which the lock rod 7A is fitted (see FIG. 11). If the lock rod 7A is fitted into the recess 51D, the push rod 51 does not move.

That is, as shown in FIG. 2, the rod casing 52 is fixed to the main casing 9. The main casing 9 is fixed to a vehicle. The lock rod 7A can be displaced between the position where it is fitted into the recess 51D and the position where it is detached from the recess 51D.

The lock rod 7A is integrated with a helical rack 7B. The helical rack 7B can be displaced in a direction perpendicular to the length direction of the rod casing 52. The helical rack 7B performs displacement by receiving a force from a helical gear 7C.

The helical gear 7C can be rotated by a rotational force from a worm rod 7D. The worm rod 7D is driven to rotate by an electric motor 7E. In the first embodiment, the electric motor 7E, namely the locking device 7, operates interlocked with a lockup device (not shown in drawings) of a door (not shown in drawings) for alighting and boarding.

Specifically, the electric motor 7E operates in such a manner that if the lockup device becomes into a locked state, the lock rod 7A is fitted into the recess 51D, and if the lockup device becomes into an unlocked state, the lock rod 7A is detached from the recess 51D.

3. Action of Device for Opening and Closing 3.1 Action of the Alternation Mechanism Each time the pressing force F acts on the push rod 51, the alternation mechanism 55 enables the push rod 51 to be displaced alternately between the protruding position and the containing position. FIG. 6 shows the alternation mechanism 55 in the case where the push rod 51 is in the protruding position.

If the pressing force F acts on the push rod 51 which is in the protruding position (refer to FIG. 6), each protrusion portion 55F and each protrusion portion 55G are respectively fitted into any one of the multiple slot portions 55J, and are displaced in the direction of the pressing force F, namely the containing direction D2.

When each protrusion portion 55G reaches the open end of each slot portion 55J (see FIG. 7), each protrusion portion 55G rotates about the central axis Lp by means of the rotational force Fr acting on the second cam 55C.

Thereby, each protrusion portion 55G is clamped with any one of the locking protrusion portions 55K, to become into a clamped state (refer to FIG. 8). At this time, since this clamped state is maintained by the elastic force of the spring 55A, the push rod 51 is maintained in the containing position.

If the pressing force F acts on the push rod 51 (refer to FIG. 8) located in the containing position, the second cam 55C is displaced in the containing direction D2, and each protrusion portion 55G is detached from each locking protrusion portion 55K.

At this time, by means of the rotational force Fr acting on the second cam 55C, each protrusion portion 55G rotates about the central axis Lp along the guiding portion 55N. Therefore, each protrusion portion 55G is guided to the open end of any one of the slot portions 55J.

Furthermore, if the pressing force F disappears, each protrusion portion 55F and each protrusion portion 55G are fitted into any one of the multiple slot portions 55J, and are displaced in the protrusion direction D1 by the elastic force of the spring 55A, and thus the push rod 51 returns to the protrusion position.

In addition, the guiding portion 55N is an inclined surface disposed at the first end of the restriction cylinder 55D. The guiding portion 55N is inclined in the same direction as the inclined surfaces 55L and 55M. As shown in FIG. 7, the top portion 55P of each protrusion portion 55G is a smooth curved surface.

That is to say, as shown in FIGS. 6 to 8, after the push rod 51 is displaced in the containing direction D2 when receiving the pressing force F, the push rod 51 is in the containing position or the protruding position. Hereinafter, the following moment is defined as "the push rod 51 is located at the bottom dead center", that is, when the push rod 51 is displaced between the containing position and the protruding position, the moment at which the push rod 51 is most displaced toward the containing direction D2.

3.2 Action of the Locking Portion and the Locking Component

As shown in FIG. 10, when the push rod 51 is at the protruding position, the two locking portions 53 are located at the release position. Meanwhile, the linkage mechanism 54 and the locking component 53B are shown by A in FIG. 14.

When the push rod 51 is located at the protruding position, if the pressing force F acts on the push rod 51, the protrusion portion 54B and the push rod 51 are integrally displaced towards the containing direction D2. In other words, the protrusion portion 54B is displaced in the axial groove of the cam groove 54A (refer to B in FIG. 14).

The source of the pressing force F is the force of a user such as a driver pressing towards the direction of closing the cover body 3. Therefore, when the push rod 51 is at the protruding position, when the pressing force F acts on the push rod 51, generally, the cover body 3 together with the push rod 51 is displaced towards a direction of closing the fuel filler.

In addition, the force of a user pressing the cover body 3 is transmitted to the push rod 51 via a pressing portion 3E which is a part of the cover body 3. The pressing portion 3E is disposed on the side of the push rod 51 of the cover body 3. The pressing portion 3E of the first embodiment is located in the locked body 3C.

If the push rod 51 approaches the bottom dead center, the two locking portions 53 approach the cover body 3 by penetrating the through hole 3D, and the two locking portions 53 are separated from the two locked portions 3B. At this time, since the protrusion portion 54B enters the radial groove of the cam groove 54A, the two locking portions 53, namely the locking component 53B, start rotational displacement (refer to C in FIG. 14).

In addition, in the first embodiment, during the period when the two locking portions 53 are separated from the two locked portions 3B, the locking component 53B rotates from before the push rod 51 reaches the bottom dead center to after the push rod 51 reaches the bottom dead center.

After the push rod 51 reaches the bottom dead center, the push rod 51 is displaced in the protruding direction D1 and is in the containing position (refer to D in FIG. 14). As shown in FIG. 9, if the push rod 51 is in the containing position, the cover body 3 remains in a position of closing the fuel filler because the two locking portions 53 are in the locking position, and the two locking portions 53 and the two locked portions 3B become into a locked state.

If the pressing force F acts on the push rod 51 shown in FIG. 9, the push rod 51 is displaced towards the protruding position after being displaced to the bottom dead center. At this time, since the protrusion portion 54B moves in the radial groove of the cam groove 54A, the two locking portions 53 are rotationally displaced.

In other words, during the separation period, from before the push rod 51 reaches the bottom dead center to after the push rod 51 reaches the bottom dead center, the locking component 53B rotates (refer to E in FIGS. 14 and F in FIG. 14).

As a result, the two locking portions 53 are restored from the lock position to the release position. At this time, since the protrusion portion 54B is displaced towards the protruding direction D1 inside the axial groove of the cam groove 54A, the cover body 3 is pressed by the push rod 51 towards the direction of opening the fuel filler.

Furthermore, in the first embodiment, every time the pressing force F acts, the locking component 53B rotates by 90 degrees in the same direction. That is to say, every time the pressing force F acts, the locking component 53B is alternately displaced between the release position and the lock position while rotating in one direction.

4. Features of the Device for Opening and Closing a Cover Body of the First Embodiment The device for opening and closing a cover body 1 has a connecting portion 53A that connects the two locking portions 53 with the rod casing 52. As a result, the external force acting on the cover body 3 in the opening direction acts on the rod casing 52 via the two locking portions 53 and does not directly act on the push rod 51. In other words, the external force does not directly act on the push rod 51 that can be displaced. Therefore, the number of components of the device for opening and closing a cover body 1 can be reduced and the structure can be simplified.

When the two locking portions 53 are located at the release position, the second end 51C of the push rod 51 is closer to the cover body 3 than the two locking portions 53. Thereby, the cover body 3 can be pressed in the direction of opening the cover body 3 by the push rod 51.

The device for opening and closing a cover body 1 has an alternate mechanism 55, and each time a pressing force acts on the push rod 51, the alternate mechanism 55 enables the push rod 51 to be alternately displaced between the first position and the second position. As a result, the push rod 51 can be easily undergo reciprocation displacement.

When the two locking portions 53 are separated from the two locked portions 3B, the linkage mechanism 54 enables the two locking portions 53 to be rotationally displaced. Thereby, the rotational force required for the rotational displacement of the two locked portions 3B is reduced, and the wear of the two locking portions 53 and the two locked portions 3B is suppressed.

Provided that when the two locking portions 53 are in contact with the two locked portions 3B, i.e., when the contact surface pressure is greater than the upper limit, if the two locking portions 53 are rotationally displaced, the rotational force required for the rotational displacement of the two locked portions 3B increases, and the two locking portions 53 and the two locked portions 3B are worn out in advance.

A detachment groove 54C is disposed in the inner peripheral surface 53F of the locking component 53B. The detachment groove 54C branches from the cam groove 54A and extends to the first end of the inner peripheral surface 53F. Thus, when the two locking portions 53 are in the lock position, users can forcibly open the cover body 3 even if the linkage mechanism 54, the alternation mechanism 55, or the locking device 7 fails.

In other words, in order to forcibly open the cover body 3, it is necessary that the locking component 53B can be detached from the push rod 51. Should the detachment groove 54C be not provided, the locking component 53B could not be separated from the push rod 51 since the protrusion portion 54B of the locking component 53B was locked on the push rod 51.

Reversely, in the device for opening and closing a cover body 1 of the first embodiment, since the detachment groove 54C is provided, the locking component 53B can be separated from the push rod 51 by means of the protrusion portion 54B passing through the detachment groove 54C. Therefore, the cover body 3 can be forcibly opened. In addition, the connection strength of the connecting portion 53A is set so that when a force with a magnitude larger than preset value is applied to the locking component 53B, the connection between the locking component 53B and the rod casing 52 can be released.

The branch portion leading to the detachment groove 54C is disposed at a position deviating from the "lock position of the protrusion portion 54B" to the "release position of the protrusion portion 54B" in the cam groove 54A. Therefore, when users forcibly open the cover body 3, the protrusion portion 54B can be reliably introduced into the detachment groove 54C.

The Second Embodiment

In the first embodiment, during the period in which the two locking portions 53 are separated from the two locked portions 3B, the locking component 53B rotates from before the push rod 51 reaches the bottom dead center to after the push rod 51 reaches the bottom dead center.

Figure 15:
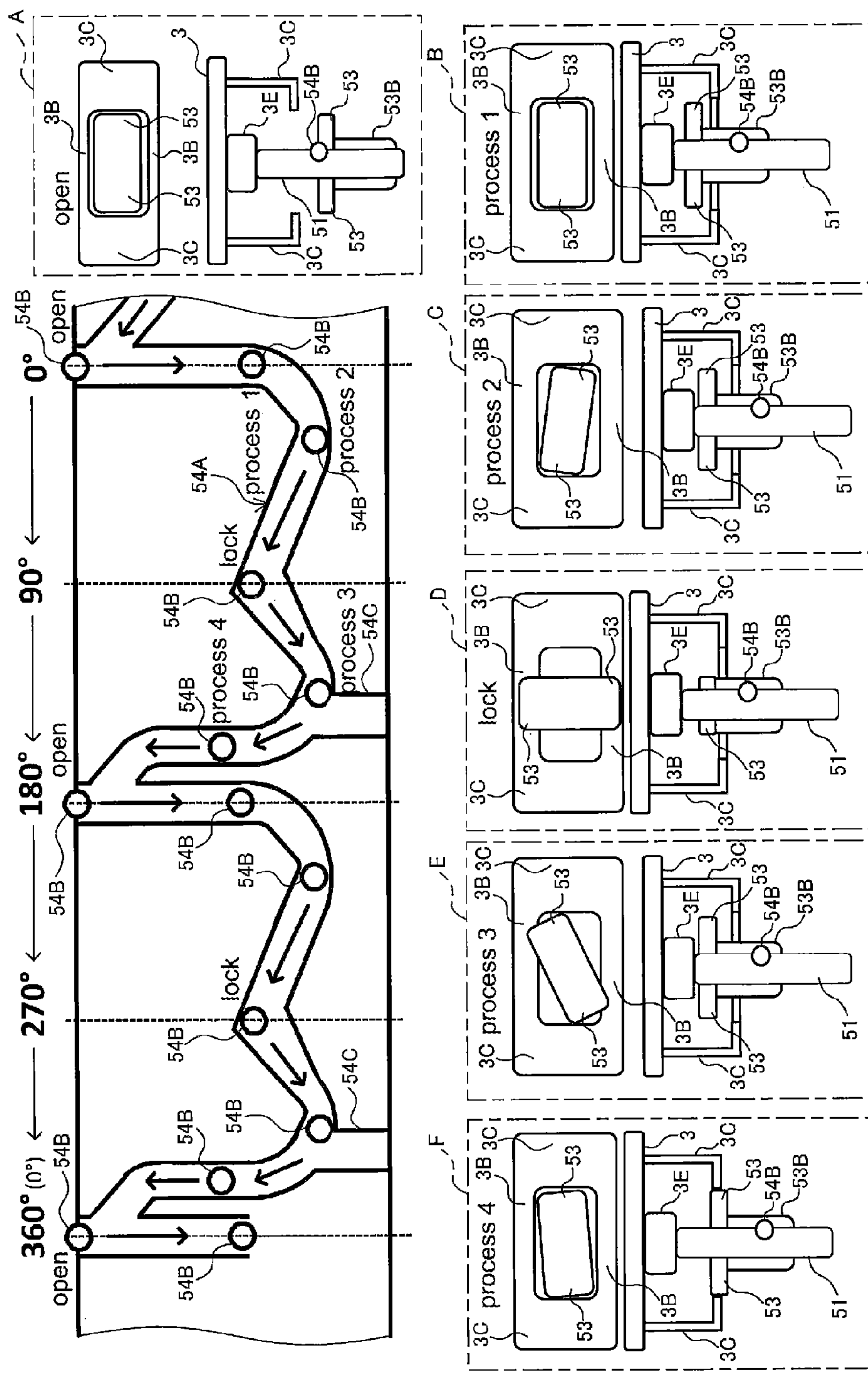
FIG. 15 is an operation explanatory diagram of the linkage mechanism of the second embodiment.

Compared to the above case, as shown in FIG. 15, in the second embodiment, when the push rod 51 is displaced from the protruding position to the containing position, during the separation period, the locking component 53B rotates after the push rod 51 reaches the bottom dead center.

<Action of the Locking Portion and the Locking Component>

When the push rod 51 is at the protruding position (refer to A in FIG. 15), if the pressing force F acts on the push rod 51, the protrusion portion 54B and the push rod 51 are displaced in the containing direction D2 integrally.

Before the push rod 51 reaches the bottom dead center, the protrusion portion 54B is displaced inside the axial groove of the cam groove 54A (refer to B in FIGS. 15 and C in FIG. 15). After the push rod 51 reaches the bottom dead center, the protrusion portion 54B enters the radial groove of the cam groove 54A (refer to D in FIG. 15).

In other words, during the separation period, before the push rod 51 reaches the bottom dead center, the locking component 53B does not rotate, while the locking component 53B rotates after the push rod 51 reaches the bottom dead center.

After the push rod 51 reaches the bottom dead center, the push rod 51 is displaced in the protruding direction D1 and is in the containing position. If the push rod 51 is in the containing position, the cover body 3 can be maintained in the position of closing the fuel filler since the two locking portions 53 are in locked position and the two locking portions 53 and the two locked portions 3B become into a locked state.

When the push rod 51 is in the containing position, if the pressing force F acts on the push rod 51, the push rod 51 is displaced to the protruding position after displaced to the bottom dead center. At this time, since the protrusion portion 54B moves in the radial groove of the cam groove 54A, the two locking portions 53 are rotationally displaced.

That is to say, during the separation period, from before the push rod 51 reaches the bottom dead center to after the push rod 51 reaches the bottom dead center, the locking component 53B rotates (refer to E in FIGS. 15 and F in FIG. 15).

As a result, the two locking portions 53 are restored from the lock position to the release position. At this time, since the protrusion portion 54B is displaced in the protruding direction D2 inside the axial groove of the cam groove 54A, the cover body 3 is pressed by the push rod 51 in the direction of opening the fuel filler.

In addition, the same constituent elements as those in the first embodiment are denoted by the same reference signs as those in the first embodiment, and descriptions of the same structures as those in the first embodiment are omitted.

The Third Embodiment

In the first embodiment, during the separation period in which the two locking portions 53 are separated from the two locked portions 3B, from before the push rod 51 reaches the bottom dead center to after the push rod 51 reaches the bottom dead center, the locking component 53B rotates.

Figure 16:
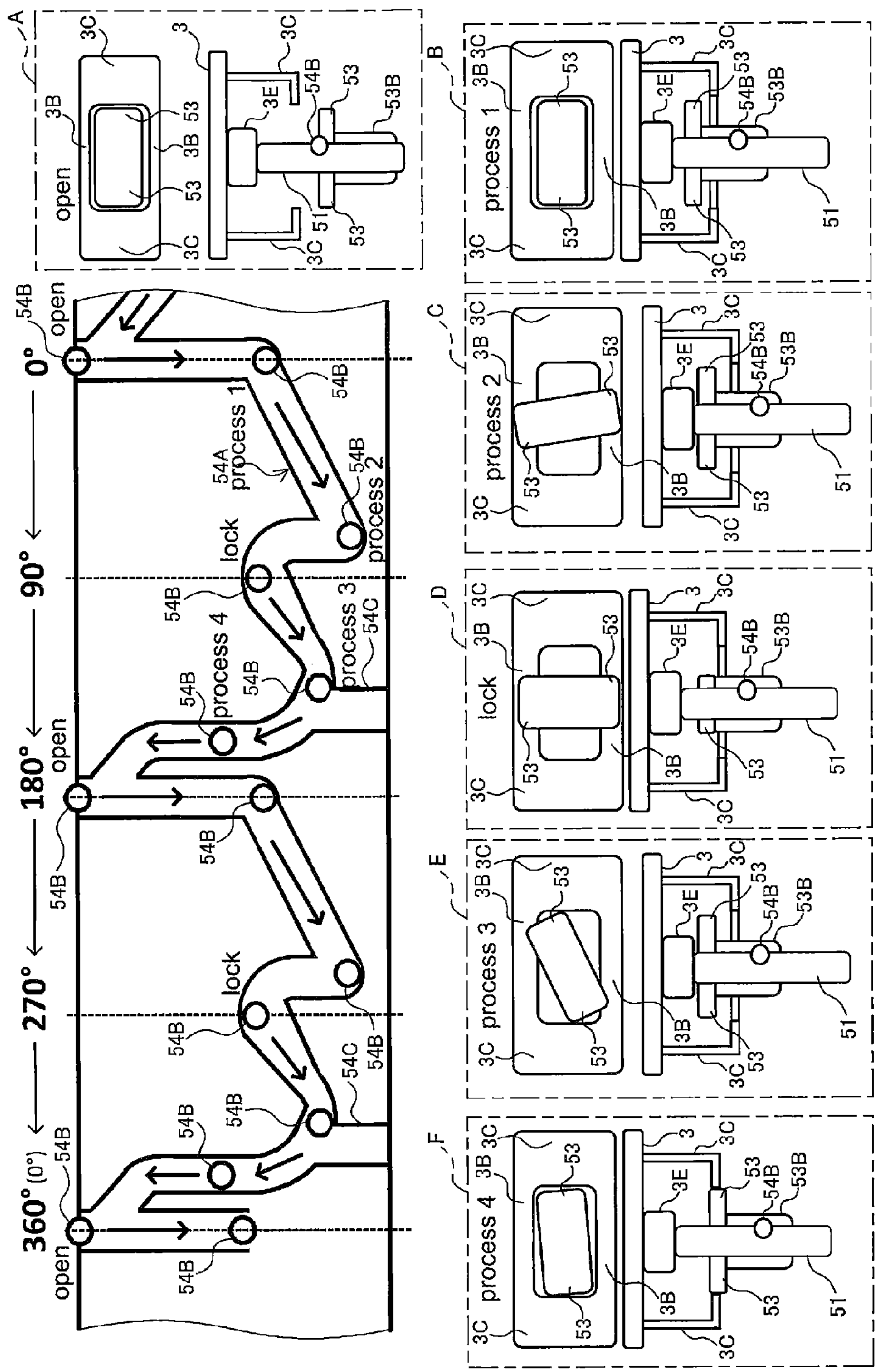
FIG. 16 is an operation explanatory diagram of the linkage mechanism of the third embodiment.

Compared to the above case, as shown in FIG. 16, in the third embodiment, when the push rod 51 is displaced from the protruding position to the containing position, the locking component 53B rotates, during the separation period, before the push rod 51 reaches the bottom dead center.

<Actions of the Locking Portion and the Locking Component>

When the push rod 51 is at the protruding position (refer to A in FIG. 16), if the pressing force F acts on the push rod 51, the protrusion portion 54B and the push rod 51 are integrally displaced in the containing direction D2.

The protrusion portion 54B is displaced inside the radial groove (refer to C in FIG. 16) after the protrusion portion is displaced in axial groove of the cam groove 54A (refer to B in FIG. 16) and before the push rod 51 reaches the bottom dead center. After the push rod 51 reaches the bottom dead center, the protrusion portion 54B is displaced in the protrusion direction D1 inside the axial groove.

That is to say, during the separation period, the locking component 53B rotates before the push rod 51 reaches the bottom dead center, and does not rotate after the push rod 51 reaches the bottom dead center.

After the push rod 51 reaches the bottom dead center, the push rod 51 is displaced in the protruding direction D1 and is in the containing position. If the push rod 51 is in the containing position, the two locking portions 53 are in the lock position, and the cover body 3 can be maintained in the position of closing the fuel filler since the two locking portions 53 and the two locked portions 3B become into a locked state.

When the push rod 51 is in the containing position, if the pressing force F acts on the push rod 51, the push rod 51 is displaced to the protruding position after being displaced to the bottom dead center. At this time, since the protrusion portion 54B moves inside the radial groove of the cam groove 54A, the two locking portions 53 are rotationally displaced.

In other words, during the separation period, from before the push rod 51 reaches the bottom dead center to after the push rod 51 reaches the bottom dead center, the locking component 53B rotates (refer to E in FIGS. 16 and F in FIG. 16).

As a result, the two locking portions 53 are restored from the lock position to the release position. At this time, since the protrusion portion 54B is displaced towards the protruding direction D2 inside the axial groove of the cam groove 54A, the cover body 3 is pressed by the push rod 51 in the direction of opening the fuel filler.

In addition, the same constituent elements as those of the first and second embodiments are denoted by the same reference signs as those of the first and second embodiments, and descriptions of the same structures as those of the first and second embodiments are omitted.

Other Embodiments

In the first to third embodiments, the device for opening and closing a cover body 1 has two locking portions 53. However, the present disclosure is not limited to this, i.e., the device for opening and closing a cover body 1 may have, for example, one or three or more locking portions 53.

In the first to third embodiments, the pressing portion 3E is in contact with the push rod 51. However, the present disclosure is not limited to this. That is, for example, the pressing portion 3E may not be provided.

In the first to third embodiments, when the two locking portions 53 are in the release position, the second end 51C of the push rod 51 is closer to the cover body 3 than the two locking portions 53.

However, the present disclosure is not limited to this. That is, for example, when the two locking portions 53 are in the release position, the second end 51C of the push rod 51 may be closer to the rod casing 52 than the two locking portions 53.

In the first to third embodiments, the push rod 51 penetrates the through hole 53C of the locking component 53B. However, the present disclosure is not limited to this. That is, for example, the push rod 51 may not penetrate the locking component 53B, but may be located at a position where the central axis of the push rod 51 is deviated from the central axis of the locking component 53B.

The linkage mechanism 54 of the first to third embodiments uses a force that enables the push rod 51 to be displaced parallel to the central axis Lp, to enable the two locking portions 53 to be rotationally displaced. However, the present disclosure is not limited to this.

In other words, the linkage mechanism 54 of the first to third embodiments is a reversible mechanism. That is to say, when the protrusion portion 54B is located in the radial groove and when the locking component 53B is forcibly rotationally displaced, the linkage mechanism 54 enables the push rod 51 to be displaced in the axial direction interlocked with the rotational displacement.

Therefore, the linkage mechanism 54 enables the push rod 51 to be displaced by utilizing the force applied to the locking component 53B to rotate the locking component 53B.

The connecting portion 53A of the first to third embodiments connects the locking portion 53, namely the locking component 53B, and the rod casing 52. However, the present disclosure is not limited to this.

That is, for example, the connecting portion 53A may connect the locking component 53B and the main case 9, and the connecting portion 53A may be constituted by parts other than the fitting portion 53D and the fitted portion 53E.

In the second embodiment, when the push rod 51 is displaced from the protruding position to the containing position, the locking component 53B rotates after the push rod 51 reaches the bottom dead center.

However, the present disclosure is not limited to this. That is, for example, the locking component 53B may also rotate after the push rod 51 reaches the bottom dead center, under the condition that the push rod 51 is displaced from the containing position to the protruding position.

In the third embodiment, when the push rod 51 is displaced from the protruding position to the containing position, the locking component 53B rotates before the push rod 51 reaches the bottom dead center.

However, the present disclosure is not limited to this. That is, for example, the locking component 53B may also rotate before the push rod 51 reaches the bottom dead center, under the condition that the push rod 51 is displaced from the containing position to the protruding position.

That is to say, it is sufficient that the linkage mechanism 54 enables the two locking portions 53 to be displaced rotationally when the two locking portions 53 are separated from the two locked portions 3B, and the timing of the rotational displacement of the two locking portions 53 is not limited to before or after the bottom dead center.

In the first to third embodiments, the cam groove 54A is disposed on the inner peripheral surface 53F of the locking component 53B, and the protrusion portion 54B is disposed on the outer peripheral surface of the push rod 51. However, the present disclosure is not limited to this. That is, for example, the protrusion portion 54B may be disposed on the inner peripheral surface 53F of the locking component 53B, and the cam groove 54A may be disposed on the outer peripheral surface of the push rod 51.

In the first to third embodiments, a detachment groove 54C is provided, and the detachment groove 54C extends to the first end of the locking component 53B. However, the present disclosure is not limited to this. That is, for example, a detachment groove 54C extending to the second end, provided with the locking portion 53, in the locking component 53B may be provided, or the detachment groove 54C may not be provided.

The linkage mechanism 54 of the first to third embodiments has a cam groove 54A and a protrusion portion 54B. However, the present disclosure is not limited to this. That is, for example, the linkage mechanism 54 may be a gear mechanism comprising a rack, pinion, helical gear, and the like.

In the linkage mechanism 54 of the first to third embodiments, the protrusion portion 54B is displaced in one direction inside the cam groove 54A. However, the present disclosure is not limited to this. That is, in the linkage mechanism 54, for example, the protrusion portion 54B may undergo reciprocation displacement in the cam groove 54A.

The device for opening and closing a cover body 1 of the first to third embodiments is an opening-closing device that opens and closes a closing body of a fuel filler of a vehicle. However, the present disclosure is not limited to this. That is, for example, the present disclosure can also be applied to other devices for opening and closing a cover body (including those other than vehicles) such as opening-closing devices for opening and closing a closing body of a charging portion of an electric vehicle.

The electric motor 7E of the first to third embodiments operates in such a manner that if the lockup device becomes into a locked state, the lock rod 7A is fitted into a recess, and if the lockup device becomes into an unlocked state, the lock rod 7A is separated from the recess. However, the present disclosure is not limited to this.

On the push rod 51 of the first to third embodiments, a flat portion 51B is disposed as a restriction portion that prevents the push rod 51 from rotating about the central axis Lp. However, the present disclosure is not limited to this.

That is, for example, the restriction portion may also have: a groove portion, on the outer peripheral surface of the push rod 51, extending in the direction of the central axis Lp; and a protrusion portion, protruding from the inner peripheral surface of the rod casing 52 to the groove portion. In addition, this restriction portion may not be provided.

The device for opening and closing a cover body 1 of the first to third embodiments enables the push rod 51 to be displaced by means of the alternation mechanism 55. However, the present disclosure is not limited to this.

In other words, for example, in the present disclosure, (a) the alternation mechanism 55 may not be provided, (b) an actuator such as an electric motor may be provided instead of the alternation mechanism 55, to enable the push rod 51 to be displaced, and (c) an operation cable may also be provided instead of the alternation mechanism 55, to enables the push rod 51 to be displaced.

Meanwhile, it is sufficient that the present disclosure only complies with the purposes described in the above embodiments and the present disclosure is not limited by the above embodiments. Therefore, for example, at least two of the multiple embodiments described above may be combined. In addition, for example, in the above embodiments, any one of the illustrated structural elements or the structural elements denoted by reference signs may be omitted.

The invention claimed is:

1. A device for opening and closing a cover body that controls opening and closing of an opening portion, which are achieved by the cover body, wherein the device for opening and closing the cover body comprises a rod, wherein the rod is able to be displaced between a first position and a second position;

a casing, wherein the casing contains at least a portion of the rod;

a locking portion, wherein the locking portion is able to be displaced rotationally between a lock position and a release position, and the locking portion is able to rotate about a central axis parallel to a displacement direction of the rod, wherein the lock position is a position that is able to be locked with the cover body, and the release position is a position that is not able to be locked with the cover body;

a linkage mechanism, wherein the linkage mechanism enables a linkage between a rotational displacement of the locking portion and a displacement of the rod; and a connecting portion, wherein the connecting portion connects the locking portion to the casing, so as to allow the locking portion to rotate between the lock position and the release position and to restrict displacement of the locking portion in a direction of the central axis, wherein the device for opening and closing the cover body further comprises a locking component, wherein the locking component is provided with the locking portion and a through hole through which the rod penetrates, wherein an outer peripheral surface of the rod is referred to as a second surface, and an inner peripheral surface of the through hole is referred to as a first surface, the linkage mechanism has a cam groove disposed on the first surface, and a protrusion portion which is disposed on the second surface and in sliding contact with an inner wall of the cam groove, and a detachment groove is disposed on the first surface, and the detachment groove is branched from the cam groove and extends to an end of the first surface.

2. The device for opening and closing a cover body according to claim 1, wherein when the locking portion is in the release position, an end of the rod close to the locking portion is closer to the cover body than the locking portion.

3. The device for opening and closing a cover body according to claim 2, further comprising an alternation mechanism, wherein each time a pressing force F acts on the rod, the alternation mechanism enables the rod to be alternately displaced between the first position and the second position.

4. The device for opening and closing a cover body according to claim 2, wherein the linkage mechanism enables the locking portion to be rotationally displaced when the locking portion is detached from a locked portion of the cover body, wherein the locked portion is a part of the cover body that is in contact with the locking portion located at the lock position.

5. The device for opening and closing a cover body according to claim 1, further comprising an alternation mechanism, wherein each time a pressing force F acts on the rod, the alternation mechanism enables the rod to be alternately displaced between the first position and the second position.

6. The device for opening and closing a cover body according to claim 5, wherein the linkage mechanism enables the locking portion to be rotationally displaced when the locking portion is detached from a locked portion of the cover body, wherein the locked portion is a part of the cover body that is in contact with the locking portion located at the lock position.

7. The device for opening and closing a cover body according to claim 1, wherein the linkage mechanism enables the locking portion to be rotationally displaced when the locking portion is detached from a locked portion of the cover body, wherein the locked portion is a part of the cover body that is in contact with the locking portion located at the lock position.

8. The device for opening and closing a cover body according to claim 1, wherein a position of the protrusion portion in the cam groove is configured as a lock position of the protrusion portion, when the locking portion is in the lock position, and a position of the protrusion portion in the cam groove is configured as a release position of the protrusion portion, when the locking portion is in the release position, and a branch portion between the detachment groove and the cam groove is disposed at a position in the cam groove and disposed at a position where it deviates from the lock position of the protrusion portion to the release position of the protrusion portion.

9. A device for opening and closing a cover body that controls opening and closing of an opening portion, which are achieved by the cover body, wherein the device for opening and closing the cover body comprises a rod, wherein the rod is able to be displaced between a first position and a second position;

a casing, wherein the casing contains at least a portion of the rod;

a locking portion, wherein the locking portion is able to be displaced rotationally between a lock position and a release position, and the locking portion is able to rotate taking a central axis parallel to a displacement direction of the rod as a center, wherein the lock position is a position that is able to be locked with the cover body, and the release position is a position that is not able to be locked with the cover body;

a linkage mechanism, wherein the linkage mechanism enables the locking portion to be displaced rotationally by using a force that enables the rod to be displaced in a direction parallel to the central axis; and a connecting portion, wherein the connecting portion connects the locking portion to the casing, so as to allow the locking portion to rotate between the lock position and the release position and to restrict displacement of the locking portion in a direction of the central axis, wherein the device for opening and closing the cover body further comprises a locking component, wherein the locking component is provided with the locking portion and a through hole through which the rod penetrates, wherein an outer peripheral surface of the rod is referred to as a second surface, and an inner peripheral surface of the through hole is referred to as a first surface, the linkage mechanism has a cam groove disposed on the first surface, and a protrusion portion which is disposed on the second surface and in sliding contact with an inner wall of the cam groove, and a detachment groove is disposed on the first surface, and the detachment groove is branched from the cam groove and extends to an end of the first surface.

10. The device for opening and closing a cover body according to claim 9, wherein when the locking portion is in the release position, an end of the rod close to the locking portion is closer to the cover body than the locking portion.

11. The device for opening and closing a cover body according to claim 9, further comprising an alternation mechanism, wherein each time a pressing force F acts on the rod, the alternation mechanism enables the rod to be alternately displaced between the first position and the second position.

12. The device for opening and closing a cover body according to claim 9, wherein the linkage mechanism enables the locking portion to be rotationally displaced when the locking portion is detached from a locked portion of the cover body, wherein the locked portion is a part of the cover body that is in contact with the locking portion located at the lock position.

* * * * *